United States Patent
Abotabl et al.

(10) Patent No.: US 11,658,723 B2
(45) Date of Patent: May 23, 2023

(54) ENERGY HARVESTING VIA SELF-INTERFERENCE IN A FULL-DUPLEX COMMUNICATION MODE

(71) Applicant: QUALCOMM Incorporated, San Diego, CA (US)

(72) Inventors: Ahmed Attia Abotabl, San Diego, CA (US); Ahmed Elshafie, San Diego, CA (US); Abdelrahman Mohamed Ahmed Mohamed Ibrahim, San Diego, CA (US); Muhammad Sayad Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/472,938

(22) Filed: Sep. 13, 2021

(65) Prior Publication Data
US 2023/0081754 A1    Mar. 16, 2023

(51) Int. Cl.
*H04B 7/0408* (2017.01)
*H04B 7/08* (2006.01)
*H04B 7/0426* (2017.01)
*H04B 17/10* (2015.01)

(52) U.S. Cl.
CPC ........... *H04B 7/0857* (2013.01); *H04B 7/043* (2013.01); *H04B 7/0408* (2013.01); *H04B 17/102* (2015.01)

(58) Field of Classification Search
CPC .... H04B 7/0857; H04B 7/0408; H04B 7/043; H04B 17/102
See application file for complete search history.

(56) References Cited

U.S. PATENT DOCUMENTS

| | | | | |
|---|---|---|---|---|
| 10,224,982 | B1 * | 3/2019 | Leabman | H02J 50/20 |
| 2013/0345695 | A1 * | 12/2013 | McPherson | H02J 50/27 606/34 |
| 2014/0004912 | A1 * | 1/2014 | Rajakarunanayake | H02J 7/04 455/573 |
| 2015/0303741 | A1 * | 10/2015 | Malik | H02J 50/20 307/104 |
| 2016/0112078 | A1 * | 4/2016 | Ju | H02J 50/001 370/278 |

(Continued)

*Primary Examiner* — Kenneth T Lam
(74) *Attorney, Agent, or Firm* — Holland & Hart LLP/Qualcomm Incorporated

(57) ABSTRACT

Methods, systems, and devices for wireless communications are described. In some systems, a user equipment (UE) may operate in accordance with a full-duplex communication mode and may be scheduled for an uplink transmission without a simultaneous downlink reception. For example, the UE may actively operate both a first one or more antenna panels for transmission and a second one or more antenna panels for reception and, in scenarios in which the UE is performing an uplink transmission without simultaneously receiving a downlink transmission, the UE may use self-interference from the uplink transmission at the second one or more antenna panels for energy harvesting. For example, the UE may receive the self-interference associated with the uplink transmission at the second one or more antenna panels, may refrain from applying interference cancellation, and may instead use a received energy from the self-interference to power one or more components of the UE.

30 Claims, 18 Drawing Sheets

(56) References Cited

U.S. PATENT DOCUMENTS

| | | | | |
|---|---|---|---|---|
| 2017/0310380 A1* | 10/2017 | Kim | ................ | H04L 5/14 |
| 2017/0324148 A1* | 11/2017 | Stevenson | ................ | G02B 5/32 |
| 2018/0283913 A1* | 10/2018 | Chen | ................ | A61B 5/002 |
| 2019/0089204 A1* | 3/2019 | Lee | ................ | H04W 52/248 |
| 2021/0409130 A1* | 12/2021 | Greene | ................ | H04W 52/28 |
| 2022/0045554 A1* | 2/2022 | Leabman | ................ | H05B 3/342 |
| 2022/0053353 A1* | 2/2022 | Lee | ................ | H04L 5/0048 |

* cited by examiner

ENERGY HARVESTING VIA SELF-INTERFERENCE IN A FULL-DUPLEX COMMUNICATION MODE

FIELD OF TECHNOLOGY

The following relates to wireless communications, including energy harvesting via self-interference in a full-duplex communication mode.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some systems, a UE may operate in accordance with a full-duplex communication mode. In accordance with the full-duplex communication mode, the UE may actively operate a first one or more antennas for transmissions from the UE and may actively operate a second one or more antennas for reception at the UE.

SUMMARY

The described techniques relate to improved methods, systems, devices, and apparatuses that support energy harvesting via self-interference in a full-duplex communication mode. Generally, the described techniques provide for an energy harvesting procedure in scenarios in which a user equipment (UE) is operating in accordance with a full-duplex communication mode and is scheduled for an uplink transmission without a simultaneous downlink reception. For example, the UE may operate in accordance with the full-duplex communication mode and actively operate both a first one or more antenna panels for uplink transmission and a second one or more antenna panels for downlink reception and, in scenarios in which the UE is transmitting an uplink signal via the first one or more antenna panels without receiving a simultaneous downlink transmission at the second one or more antenna panels, the UE may use self-interference from the uplink signal at the second one or more antenna panels for energy harvesting. In other words, the UE may receive the self-interference associated with the uplink signal at the second one or more antenna panels, may refrain from applying interference cancellation, and may instead use a received energy from the self-interference to power one or more components of the UE.

A method for wireless communication at a UE is described. The method may include transmitting, via a first one or more antenna panels of the UE, an uplink signal in accordance with a full-duplex communication mode of the UE, receiving, at a second one or more antenna panels of the UE, self-interference associated with the uplink signal, and performing an energy harvesting procedure at the second one or more antenna panels using the self-interference associated with the uplink signal.

A UE is described. The UE may include a processor, memory coupled with the processor, and instructions stored in the memory. The instructions may be executable by the processor to cause the UE to transmit, via a first one or more antenna panels of the UE, an uplink signal in accordance with a full-duplex communication mode of the UE, receive, at a second one or more antenna panels of the UE, self-interference associated with the uplink signal, and perform an energy harvesting procedure at the second one or more antenna panels using the self-interference associated with the uplink signal.

An apparatus for wireless communication at a UE is described. The apparatus may include means for transmitting, via a first one or more antenna panels of the UE, an uplink signal in accordance with a full-duplex communication mode of the UE, means for receiving, at a second one or more antenna panels of the UE, self-interference associated with the uplink signal, and means for performing an energy harvesting procedure at the second one or more antenna panels using the self-interference associated with the uplink signal.

A non-transitory computer-readable medium storing code for wireless communication at a UE is described. The code may include instructions executable by a processor to transmit, via a first one or more antenna panels of the UE, an uplink signal in accordance with a full-duplex communication mode of the UE, receive, at a second one or more antenna panels of the UE, self-interference associated with the uplink signal, and perform an energy harvesting procedure at the second one or more antenna panels using the self-interference associated with the uplink signal.

Some examples of the method, UE, apparatus, and non-transitory computer-readable medium described herein may further include operations, features, means, or instructions for performing a beam sweeping procedure associated with transmitting signaling using a set of directional beams from the first one or more antenna panels and measuring, at the second one or more antenna panels, a received energy from the signaling for each directional beam of the set of directional beams.

Some examples of the method, UE apparatus, and non-transitory computer-readable medium described herein may further include operations, features, means, or instructions for transmitting, to a base station, a report indicating the received energy at the second one or more antenna panels from the signaling for each directional beam of the set of directional beams.

Some examples of the method, UE, apparatus, and non-transitory computer-readable medium described herein may further include operations, features, means, or instructions for receiving, from the base station, an indication of a first directional beam to use for the uplink signal based on the report and a receive power at the base station of signaling transmitted via the first directional beam, where the UE transmits the uplink signal using the first directional beam based on receiving the indication.

Some examples of the method, UE apparatus, and non-transitory computer-readable medium described herein may further include operations, features, means, or instructions for transmitting, to the base station, an indication of an energy harvesting rate for operation of one or more components of the UE and receiving, from the base station, an indication of a first directional beam to use for the uplink signal based on the report and the energy harvesting rate for the operation of the one or more components of the UE, where the UE transmits the uplink signal using the first directional beam based on receiving the indication.

Some examples of the method, UE, apparatus, and non-transitory computer-readable medium described herein may further include operations, features, means, or instructions for receiving, from a base station, a control signal associated with a CG that indicates a first directional beam for CG uplink transmissions with energy harvesting and a second directional beam for CG uplink transmissions without energy harvesting, where the uplink signal includes a CG uplink transmission with energy harvesting.

In some examples of the method, UE, apparatus, and non-transitory computer-readable medium described herein, the UE performs the CG uplink transmissions with energy harvesting using the first directional beam during time periods without simultaneous downlink reception and performs the CG uplink transmissions without energy harvesting using the second directional beam during time periods with simultaneous downlink reception.

Some examples of the method, UE, apparatus, and non-transitory computer-readable medium described herein may further include operations, features, means, or instructions for refraining from applying interference cancellation associated with the uplink signal at the second one or more antenna panels, where performing the energy harvesting procedure may be based on refraining from applying the interference cancellation associated with the uplink signal.

Some examples of the method, UE, apparatus, and non-transitory computer-readable medium described herein may further include operations, features, means, or instructions for selecting the first one or more antenna panels for the transmitting of the uplink signal and the second one or more antenna panels for the receiving of the self-interference associated with the uplink signal such that a physical separation between the first one or more antenna panels and the second one or more antenna panels may be less than a threshold physical separation.

In some examples of the method, UE, apparatus, and non-transitory computer-readable medium described herein, the UE transmits the uplink signal during a time period without simultaneous downlink reception and the full-duplex communication mode of the UE may be associated with active operation of the first one or more antenna panels for transmission and active operation of the second one or more antenna panels for energy harvesting.

A method for wireless communication at a base station is described. The method may include receiving, from a UE, a report indicating, for each directional beam of a set of directional beams transmitted using a first one or more antenna panels of the UE, a received energy at a second one or more antenna panels of the UE from self-interference associated with transmissions from the first one or more antenna panels, transmitting, to the UE, an indication of a first directional beam from the set of directional beams for the UE to use for an uplink signal from the first one or more antenna panels of the UE based on the report and on whether the UE is to perform an energy harvesting procedure during transmission of the uplink signal, and receiving, from the UE, the uplink signal via the first directional beam.

A base station is described. The base station may include a processor, memory coupled with the processor, and instructions stored in the memory. The instructions may be executable by the processor to cause the base station to receive, from a UE, a report indicating, for each directional beam of a set of directional beams transmitted using a first one or more antenna panels of the UE, a received energy at a second one or more antenna panels of the UE from self-interference associated with transmissions from the first one or more antenna panels, transmit, to the UE, an indication of a first directional beam from the set of directional beams for the UE to use for an uplink signal from the first one or more antenna panels of the UE based on the report and on whether the UE is to perform an energy harvesting procedure during transmission of the uplink signal, and receive, from the UE, the uplink signal via the first directional beam.

An apparatus for wireless communication at a base station is described. The apparatus may include means for receiving, from a UE, a report indicating, for each directional beam of a set of directional beams transmitted using a first one or more antenna panels of the UE, a received energy at a second one or more antenna panels of the UE from self-interference associated with transmissions from the first one or more antenna panels, means for transmitting, to the UE, an indication of a first directional beam from the set of directional beams for the UE to use for an uplink signal from the first one or more antenna panels of the UE based on the report and on whether the UE is to perform an energy harvesting procedure during transmission of the uplink signal, and means for receiving, from the UE, the uplink signal via the first directional beam.

A non-transitory computer-readable medium storing code for wireless communication at a base station is described. The code may include instructions executable by a processor to receive, from a UE, a report indicating, for each directional beam of a set of directional beams transmitted using a first one or more antenna panels of the UE, a received energy at a second one or more antenna panels of the UE from self-interference associated with transmissions from the first one or more antenna panels, transmit, to the UE, an indication of a first directional beam from the set of directional beams for the UE to use for an uplink signal from the first one or more antenna panels of the UE based on the report and on whether the UE is to perform an energy harvesting procedure during transmission of the uplink signal, and receive, from the UE, the uplink signal via the first directional beam.

Some examples of the method, base station, apparatus, and non-transitory computer-readable medium described herein may further include operations, features, means, or instructions for receiving, from the UE, an indication of an energy harvesting rate for operation of one or more components of the UE, where transmitting the indication of the first directional beam to use for the uplink signal from the first one or more antenna panels of the UE may be based on the report and the energy harvesting rate for the operation of the one or more components of the UE.

Some examples of the method, base station, apparatus, and non-transitory computer-readable medium described herein may further include operations, features, means, or instructions for transmitting, to the UE, a control signal associated with a CG that indicates the first directional beam for CG uplink transmissions with energy harvesting and a second directional beam for CG uplink transmissions without energy harvesting, where the uplink signal includes a CG uplink transmission with energy harvesting.

In some examples of the method, base station, apparatus, and non-transitory computer-readable medium described herein, the base station receives the CG uplink transmissions with energy harvesting via the first directional beam during time periods without simultaneous transmission to the UE and receives the CG uplink transmissions without energy harvesting via the second directional beam during time periods with simultaneous transmission to the UE.

Some examples of the method, base station, apparatus, and non-transitory computer-readable medium described herein may further include operations, features, means, or instructions for selecting the first directional beam for the UE to use for the uplink signal from the first one or more antenna panels of the UE based on the report, whether the UE may be to perform the energy harvesting procedure during the transmission of the uplink signal, and a receive power at the base station of signaling transmitted via the set of directional beams, where transmitting the indication of the first directional beam may be based on the selecting.

In some examples of the method, base station, apparatus, and non-transitory computer-readable medium described herein, the base station receives the uplink signal during a time period without simultaneous downlink transmission to the UE and the UE may be to perform the energy harvesting procedure during the time period based on the time period being without the simultaneous downlink transmission to the UE.

DETAILED DESCRIPTION

Figure 1:
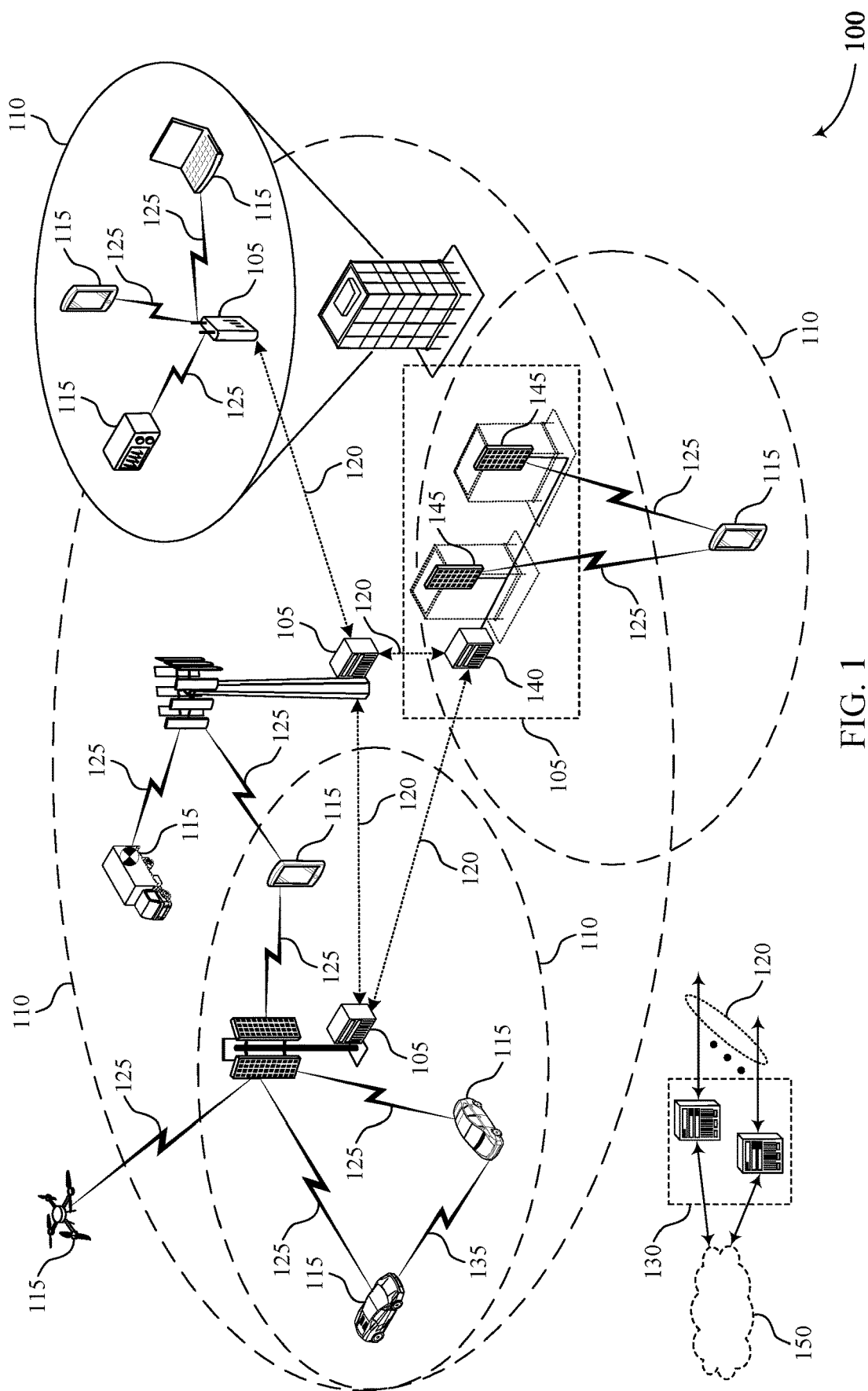
FIGS. 1 and 2 illustrate examples of wireless communications systems that support energy harvesting via self-interference in a full-duplex communication mode in accordance with aspects of the present disclosure.

In some wireless communications systems, a user equipment (UE) may be capable of simultaneously transmitting from a first one or more antenna panels of the UE and receiving at a second one or more antenna panels of the UE. Such simultaneous operation of the first one or more antenna panels for transmitting and the second one or more antenna panels for receiving may be referred to herein as full-duplex communication or operation and the UE may be understood as being in a full-duplex communication mode if the UE is actively operating the first one or more antenna panels for transmitting and the second one or more antenna panels for receiving. In some cases, self-interference from transmissions via the first one or more antenna panels may adversely influence a reception at the second one or more antenna panels (e.g., may contribute to noise or otherwise disrupt other signaling that the UE is simultaneously attempting to receive) and the UE may apply some interference cancellation to reduce the self-interference experienced at the second one or more antenna panels. In some scenarios, however, the UE may transmit an uplink signal via the first one or more antenna panels without receiving a simultaneous downlink transmission at the second one or more antenna panels. In such scenarios, the interference cancellation at the second one or more antenna panels may be unnecessary and, for some UEs, may get in the way of using the self-interference from the uplink signal for other purposes.

For example, in some implementations of the present disclosure, the UE may refrain from applying interference cancellation to mitigate the self-interference from the uplink signal and may instead use the self-interference for energy harvesting. In other words, during time periods without simultaneous downlink reception, the UE may use a received energy associated with the self-interference from the uplink signal to power one or more components of the UE or to perform one or more tasks. In some implementations, the UE may use a specific directional beam for the uplink signal based on performing energy harvesting using self-interference, as different directional beams may provide different amounts of self-interference at the second one or more antenna panels of the UE.

In such implementations, the UE may perform a beam sweeping procedure to measure a received energy associated with a number of different directional beams at the second one or more antenna panels and may transmit a report to the base station indicating the received energy measurements associated with each beam. The base station may configure the specific directional beam that the UE is to use for the uplink signal based on a signal strength that the beam provides to the base station and the amount of received energy that the directional beam provides to the second one or more antenna panels. Further, in some implementations, the base station may configure the UE with multiple directional beams including a first beam that the UE is to use for uplink transmissions without simultaneous downlink reception and a second beam that the UE is to use for uplink transmissions with simultaneous downlink reception.

Particular aspects of the subject matter described herein may be implemented to realize one or more of the following potential advantages. In some implementations, and as a result of using the self-interference associated with the uplink signal for the energy harvesting procedure at the second one or more antenna panels of the UE, the UE may be able to power one or more components of the UE or to perform one or more tasks using the energy from the self-interference, which may supplement an available battery life of the UE or enable the UE to reduce a power draw on the battery of the UE, or both. For example, as a result of performing one or more tasks using the energy from the self-interference, the UE may operate at a lower device power and reduce power costs associated with such one or more tasks. Further, the UE and the base station may select directional beams to use for communication with consideration to both the signal strength provided by a beam at the base station and an amount of received energy (e.g., self-interference) provided by the beam at the second one or more antenna panels, and the UE and the base station may leverage such considerations to select a beam that satisfies constraints associated with one or both of the signal strength and the amount of received energy. As such, the UE may achieve a suitable balance between energy harvesting and communication reliability or throughput.

Aspects of the disclosure are initially described in the context of wireless communications systems. Aspects of the disclosure are also illustrated by and described with reference to a configured grant (CG) configuration, resource configurations, energy harvesting schemes, and a process flow. Aspects of the disclosure are further illustrated by and described with reference to apparatus diagrams, system diagrams, and flowcharts that relate to energy harvesting via self-interference in a full-duplex communication mode.

FIG. 1 illustrates an example of a wireless communications system 100 that supports energy harvesting via self-interference in a full-duplex communication mode in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a geographic coverage area 110 over which the UEs 115 and the base station 105 may establish one or more communication links 125. The geographic coverage area 110 may be an example of a geographic area over which a base station 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or expected functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, sometimes in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a UE 115 may operate or communicate in accordance with a full-duplex communication mode. In accordance with the full-duplex communication mode, the UE 115 may actively operate a first one or more antenna panels for transmission and actively operate a second one or more antenna panels for reception. In some scenarios, the UE 115 may receive scheduling information from a base station 105 scheduling an uplink transmission from the UE 115 during full-duplex operation (e.g., during a full-duplex slot) and the UE 115 may not receive any scheduling information that schedules reception at the UE 115 overlapping with the uplink transmission. In other words, although the UE 115 is operating in accordance with the full-duplex communication mode, the UE 115 may, in some scenarios, be scheduled for an uplink transmission without a simultaneous reception for at least a portion of the uplink transmission.

In such scenarios, the UE 115 may perform the uplink transmission via the first one or more antenna panels and may receive self-interference associated with the uplink transmission at the second one or more antenna panels. In some implementations, the UE 115 may refrain from applying interference cancellation at the second one or more antenna panels because of the lack of simultaneous reception with the uplink transmission and may instead perform an energy harvesting procedure using the self-interference associated with the uplink transmission. For example, the UE 115 may use the second one or more antenna panels to gather or harvest an energy associated with the radio frequency of the uplink transmission into a usable form that the UE 115 may use for performing some tasks, such as decoding, data reception, data encoding, or data transmission.

Figure 2:
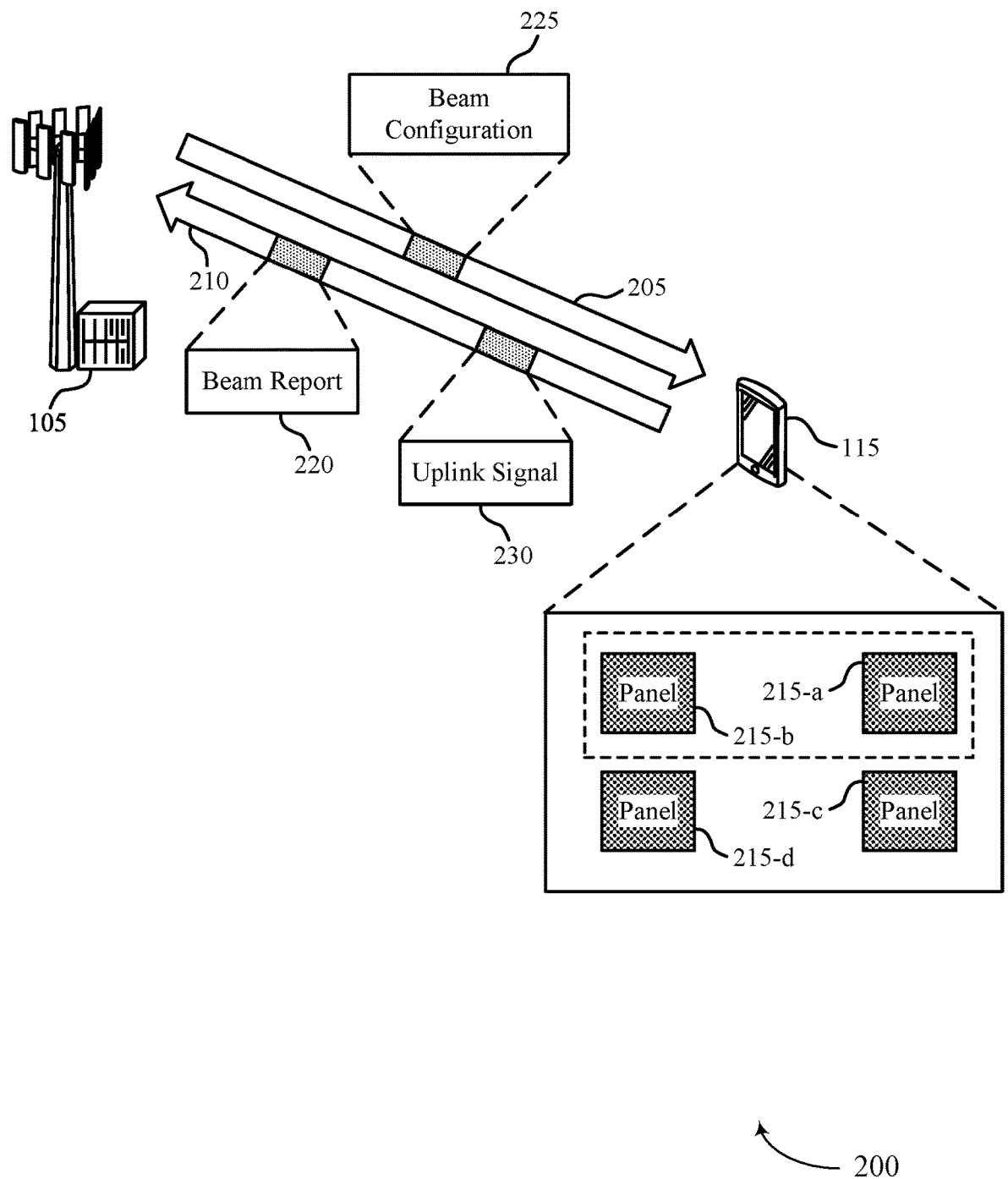

FIG. 2 illustrates an example of a wireless communications system 200 that supports energy harvesting via self-interference in a full-duplex communication mode in accordance with aspects of the present disclosure. The wireless communications system 200 may implement or be implemented to realize aspects of the wireless communications system 100. For example, the wireless communications system 200 illustrates communication between a UE 115 and a base station 105, which may be examples of corresponding devices described herein, including with reference to FIG. 1. In some examples, the UE 115 may operate in a full-duplex communication mode and may use self-interference associated with uplink transmissions for an energy harvesting procedure in scenarios in which the UE 115 is transmitting and not simultaneously receiving.

Full-duplex communication may effectively double a bandwidth between two communicating devices, such as the UE 115 and the base station 105, based on allowing the UE 115 or the base station 105, or both, to transmit and receive on a same set of resources (e.g., a same set of time resources). In some cases, the UE 115 may operate or communicate in accordance with a full-duplex communication mode as a result of actively operating a first one or more antenna panels 215 for transmission and actively operating a second one or more antenna panels 215 for reception. For example, the UE 115 may operate an antenna panel 215-*a* and an antenna panel 215-*b* for transmission and may simultaneously operate an antenna panel 215-*c* and an antenna panel 215-*d* for reception. As such, in an active full-duplex mode, the UE 115 may receive signaling from the base station 105 via a downlink 205 using one or both of the antenna panel 215-*c* and the antenna panel 215-*d* and may transmit signaling to the base station 105 via an uplink 210 using one or both of the antenna panel 215-*a* and the antenna panel 215-*b*. Additional details relating to full-duplex operation are illustrated by and described with reference to FIG. 4.

Actual full-duplex operation, however, may depend on scheduling. For example, the UE 115 may be operating or communicating during a full-duplex slot (e.g., a slot during which the UE 115 operates antenna panels 215 in accordance with full-duplex) but may receive an uplink grant without any simultaneous or overlapping downlink reception. In such scenarios in which the UE 115 is scheduled for an uplink transmission over an uplink grant without simultaneous reception, the UE 115 may experience self-interference associated with the uplink transmission, but such self-interference may not adversely impact the UE 115 because of the lack of simultaneous reception.

In other words, the UE 115 may not be constrained or expected to cancel such self-interference in any analog or digital way because of the lack of simultaneous reception. Accordingly, in some implementations, the UE 115 may refrain from mitigating the interference and, instead, may use the interference for energy harvesting. In some examples, the UE 115 may use one or more reception panels, such as one or both of the antenna panel 215-*c* and the antenna panel 215-*d*, for energy harvesting to gather or harvest the self-interference resulting from an uplink transmission (e.g., such as a transmission of an uplink signal 230) via one or more transmission panels, such as one or both of the antenna panel 215-*a* and the antenna panel 215-*b*.

In some implementations, the UE 115 may be configured to refrain from applying any analog or digital interference cancellation during a full-duplex slot with transmission and without reception (e.g., such as a full-duplex slot with transmission only). To mitigate self-interference, the UE 115 may sometimes apply analog mitigation or interference cancellation to reduce an amount of power received at a reception panel of the UE 115. As such, in implementations in which the UE 115 performs energy harvesting from the self-interference, the UE 115 may refrain from applying analog mitigation to avoid reducing the power received at the reception panel. The UE 115 may receive the configuration to refrain from applying interference cancellation in scenarios without simultaneous reception from the base station 105 or the configuration may be pre-configured (e.g., pre-loaded) at the UE 115.

In some aspects, an uplink transmission beam that the UE 115 uses for an uplink signal 230 may impact how much power is received at a receiving panel of the UE 115. Further, some uplink transmission beams may provide relatively greater amounts of power at the receiving panel but may provide a relatively lower signal strength or receive power for the uplink signal 230 at the base station 105. As such, there may be a trade-off between a "best" beam for an uplink transmission (e.g., a beam that provides a greatest signal strength or receive power for the uplink signal 230 at the base station 105) and a "best" beam for energy harvesting (e.g., a beam that provides a greatest received power or self-interference at the receiving panel of the UE 115).

To facilitate uplink beam selection with consideration to both the signal strength provided at the base station 105 and the amount of received energy at the receiving panel of the UE 115, the UE 115 may perform some calibration and reporting to the network (e.g., the base station 105). For example, because the transmission beam of the UE 115 may impact how much power the UE 115 receives at the reception panel, the UE 115 may perform offline or online calibration for the different beams and how much power the UE 115 receives at the reception side. In some examples, the UE 115 may perform an uplink transmission using each of a set of different directional beams from one or more transmission panels (e.g., from one or both of the antenna panel 215-*a* and the antenna panel 215-*b*) and may measure a received energy or power at one or more reception panels (e.g., at one or both of the antenna panel 215-*c* and the antenna panel 215-*d*) for each directional beam of the set of directional beams.

As such, the UE 115 may obtain knowledge of how much energy or power the UE 115 may receive at a reception panel of the UE 115 from an uplink transmission from the UE 115 using each of the set of different directional beams. In examples in which the UE 115 performs the calibration online, the UE 115 may use sounding reference signal (SRS) transmissions for the energy harvesting calibration. In such examples, the UE 115 may transmit an SRS via each of the set of directional beams (e.g., as part of a channel sounding procedure or a beam pair link procedure, among other examples) and may measure a received energy or power from the SRS transmissions at the one or more reception panels of the UE 115.

In some implementations, the UE 115 may transmit an indication of the measurements or the results of the energy harvesting calibration to the base station 105 via a beam report 220. For example, via the beam report 220, the UE 115 may report an amount of received energy from each beam to the network. As such, the network (e.g., the base station 105) may select a beam that is suitable for the uplink signal 230 (e.g., to provide a sufficient signal strength at the base station 105) and suitable for any energy harvesting constraints of the UE 115. For example, the UE 115 may also report, to the network (e.g., the base station 105), an energy harvesting rate for operation of one or more components of the UE 115. In other words, the UE 115 may report or request an amount of energy harvesting the UE 115 expects to obtain from self-interference or that the UE 115 may use for successful or complete operation of the one or more components. For example, the UE 115 may have a lower limit energy harvesting rate for the successful or complete operation of the one or more components and may request that the base station 105 selects a directional beam that satisfies the lower limit energy harvesting rate. The UE 115 may report such an expected or lower limit energy harvesting rate to the base station 105 via the beam report 220 or via other signaling.

As such, the base station 105 may select a directional beam for the UE 115 to use for the uplink signal 230 based on one or more of the signal strength that the directional beam provides at the base station 105, the amount of received energy or power that the directional beam may provide to the one or more reception panels of the UE 115 via self-interference (as obtained via the energy harvesting calibration), and the expected or lower limit energy harvesting rate requested by the UE 115. The base station 105 may transmit an indication of the directional beam that the UE 115 is to use for the uplink signal 230 via a beam configuration 225 and the UE 115 may use the directional beam for transmission of the uplink signal 230 accordingly.

Additionally or alternatively, the UE 115 may be configured with two beams for some communication, such as for uplink CG (UL-CG) communication. For example, some resources or instances of an UL-CG may experience overlap with downlink reception and some other resources or instances of the UL-CG may be without overlapping downlink reception. As such, the UE 115 may use a first directional beam for uplink transmissions with energy harvesting at the receiver end (e.g., such as in situations without simultaneous reception) and may use a second directional beam for uplink transmissions if there is no energy harvesting (e.g., such as in situations of simultaneous downlink reception). As such, in some implementations, the base station 105 may indicate two beams via the beam configuration 225. Further, in implementations in which the base station 105 transmits an indication of the two beams for UL-CG communication, the base station 105 may transmit the beam configuration 225 within or along with other signaling configuring or establishing the CG at the UE 115. Additional details relating to such use of two different beams at the UE 115 for UL-CG communication are illustrated by and described with reference to FIG. 3.

Further, in some implementations, the UE 115 may select which antenna panels 215 to use for the uplink signal 230 and which antenna panels to use for self-interference-based energy harvesting based on a relative positioning of the antenna panels 215 on the UE 115. In some examples, for instance, the UE 115 may select to use a first one or more antenna panels (e.g., the antenna panel 215-a and the antenna panel 215-b) for the uplink signal and to use a second one or more antenna panels (e.g., the antenna panel 215-c and the antenna panel 215-d) for the energy harvesting based on the first one or more antenna panels 215 and the second one or more antenna panels being within a threshold distance of each other. For example, to increase an amount of energy or power from self-interference that the UE 115 receives at the second one or more antenna panels 215, the UE 115 may select the antenna panels 215 such that a physical separation between the first one or more antenna panels 215 and the second one or more antenna panels is less than a threshold physical separation.

Figure 3:
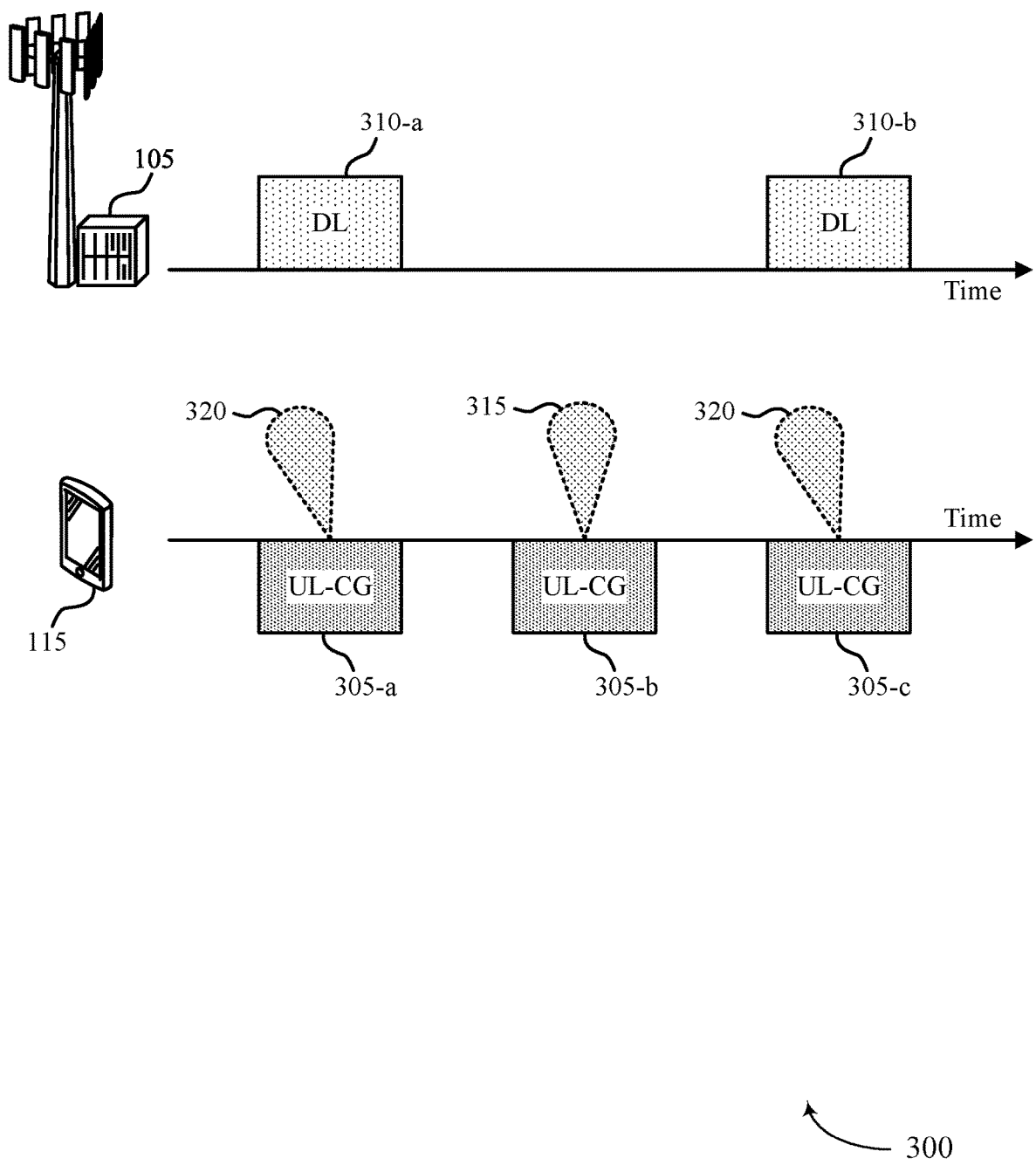
FIG. 3 illustrates an example of a configured grant (CG) configuration that supports energy harvesting via self-interference in a full-duplex communication mode in accordance with aspects of the present disclosure.

FIG. 3 illustrates an example of a CG configuration 300 that supports energy harvesting via self-interference in a full-duplex communication mode in accordance with aspects of the present disclosure. The CG configuration 300 may implement or be implemented to realize aspects of the wireless communications system 100 or the wireless communications system 200. For example, the CG configuration 300 illustrates communication between a UE 115 and a base station 105, which may be examples of corresponding devices described herein, including with reference to FIGS. 1 and 2. In some examples, the base station 105 may configure the UE 115 with the CG configuration 300 such that the UE 115 uses a different directional beam depending on whether resources or instances of an UL-CG have an overlapping downlink transmission 310.

For example, in accordance with the CG configuration 300, the UE 115 may perform multiple UL-CG transmissions 305, including an UL-CG transmission 305-a, an UL-CG transmission 305-b, and an UL-CG transmission 305-c. Further, the UE 115 may operate in accordance with a full-duplex communication mode and, during some full-duplex slots, may perform an UL-CG transmission 305 simultaneously with receiving a downlink transmission 310. For example, the UE 115 may receive a downlink transmission 310-a and a downlink transmission 310-b, and the downlink transmission 310-a may at least partially overlap in time with the UL-CG transmission 305-a and the downlink transmission 310-b may at least partially overlap in time with the UL-CG transmission 305-c. In some aspects, the UE 115 may perform the UL-CG transmissions 305 via a first one or more antenna panels of the UE 115 and may receive the downlink transmissions 310 via a second one or more antenna panels of the UE 115.

In some implementations, the UE 115 may receive an indication of two different directional beams to use for the UL-CG transmissions 305 based on whether a downlink transmission 310 overlaps in time with a specific UL-CG transmission 305. For example, the UE 115 may receive an indication of a first directional beam 315 to use for UL-CG transmissions without simultaneous reception of a downlink transmission 310 (e.g., and with energy harvesting) and an indication of a second directional beam 320 to use for UL-CG transmissions 305 with simultaneous reception of a downlink transmission 310 (e.g., and without energy harvesting). Accordingly, and as shown in FIG. 3, the UE 115 may use the second directional beam 320 for the UL-CG transmission 305-a and for the UL-CG transmission 305-c (which are performed during a time period with simultaneous reception) and the UE 115 may use the first directional beam 315 for the UL-CG transmission 305-b (which is performed during a time period without simultaneous reception).

In some aspects, the base station 105 may configure the directional beams such that the first directional beam 315 provides a relatively greater received energy at the second one or more antenna panels of the UE 115 to facilitate a relatively greater amount of energy harvesting as compared to the second directional beam 320. Additionally or alternatively, the base station 105 may configure the directional beams such that the second directional beam 320 provides a relatively smaller received energy at the second one or more antenna panels of the UE 115 (or otherwise avoids interfering with a downlink transmission 310) or provides a relatively more suitable receive power or signal strength for UL-CG transmissions 305 at the base station 105.

Figure 4:
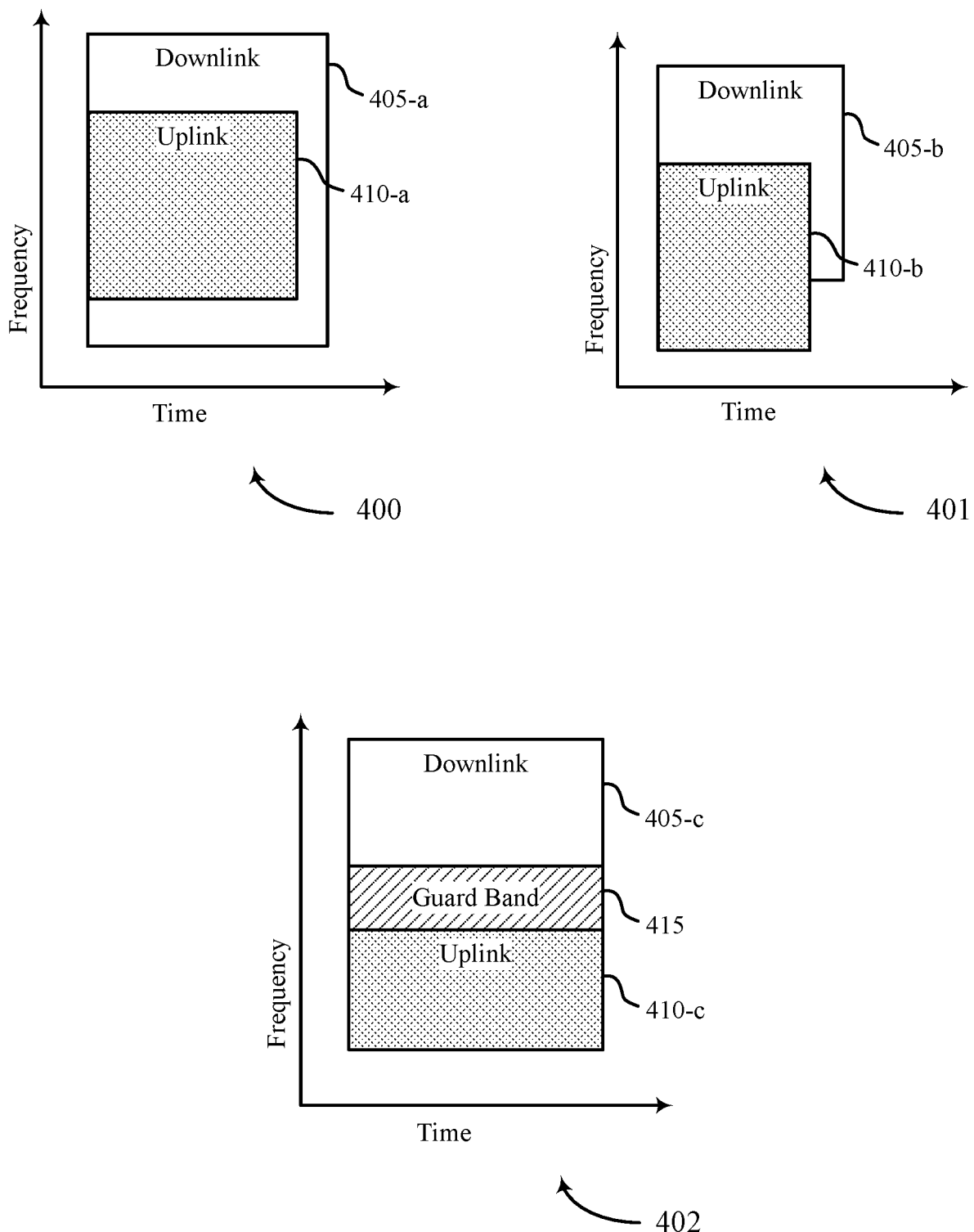
FIG. 4 illustrates examples of resource configurations that support energy harvesting via self-interference in a full-duplex communication mode in accordance with aspects of the present disclosure.

FIG. 4 illustrates examples of resource configurations 400, 401, and 402 that supports energy harvesting via self-interference in a full-duplex communication mode in accordance with aspects of the present disclosure. The resource configurations 400, 401, and 402 may implement or be implemented to realize aspects of the wireless communications system 100 or the wireless communications system 200. For example, the resource configurations 400, 401, and 402 may illustrate resource allocations for communications between a UE 115 and a base station 105, which may be examples of corresponding devices as described herein, including with reference to FIGS. 1 through 3.

In some implementations, the UE 115 and the base station 105 may support full-duplex communication according to which the UE 115 may receive one or more downlink transmissions over a downlink resource 405 and transmit one or more uplink transmissions over an uplink resource 410 to the base station 105. In some examples, the UE 115 may receive an indication of the time or frequency resources in which the downlink transmission to the UE 115 overlaps in time with the uplink transmission to the base station 105. In some cases, the resource configurations 400, 401, and 402 may be examples of the resource configurations configured by the base station 105 according to a full-duplex capability of the UE 115. There may be two different flavors of full-duplex operation, including in-band full-duplex and sub-band full-duplex. The resource configurations 400 and 401 may illustrate examples of in-band full-duplex and the resource configuration 402 may illustrate an example of sub-band full-duplex (e.g., which may be referred to as flexible duplex).

In the example of the resource configuration 400, the base station 105 may allocate a downlink resource 405-a for downlink communication to the UE 115 and may allocate an uplink resource 410-a for uplink communication to the base station 105 in overlapping frequency bands, such that the UE 115 and the base station 105 may transmit and receive over the same time and frequency resource (e.g., in an at least partially overlapping time and frequency resource). As shown in the resource configuration 400, the downlink and the uplink may share a same in-band full-duplex time or frequency resource with full overlap.

In the example of the resource configuration 401, the base station 105 may allocate a downlink resource 405-b for downlink communication to the UE 115 and may allocate an uplink resource 410-b for uplink communication to the base station 105 in overlapping frequency bands, such that the UE 115 and the base station 105 may transmit and receive on the same time and frequency resources (e.g., in an at least partially overlapping time and frequency resource). As shown in the resource configuration 401, the downlink and the uplink may share a same in-band full-duplex time or frequency resource with partial overlap.

In the example of the resource configuration 402, the base station 105 may allocate a downlink resource 405-c for downlink communication to the UE 115 and may allocate an uplink resource 410-c for uplink communication to the base station 105 in separate or different frequency resources or bands, such that the UE 115 and the base station 105 may transmit and receive at the same time and on different frequency resources. In some aspects, the downlink resource 405-c and the uplink resource 410-c may be separated in frequency by a guard band 415. In some aspects, the guard band 415 may serve to help protect against adverse impacts related to self-interference at one or both of the UE 115 and the base station 105.

Figure 5:
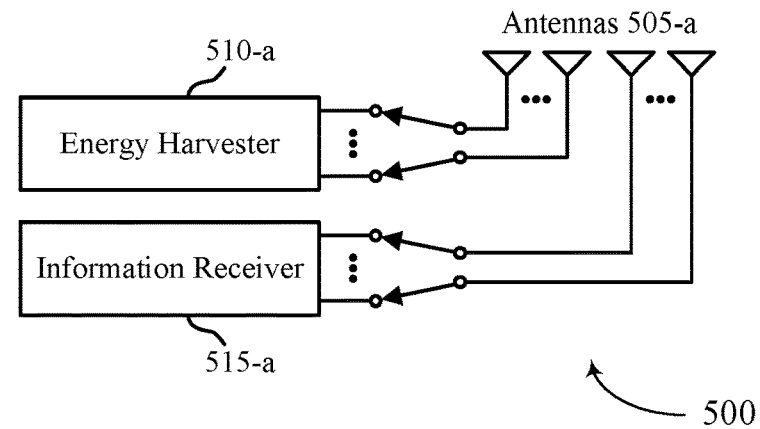
FIG. 5 illustrates examples of energy harvesting schemes that support energy harvesting via self-interference in a full-duplex communication mode in accordance with aspects of the present disclosure.
Figure 5:
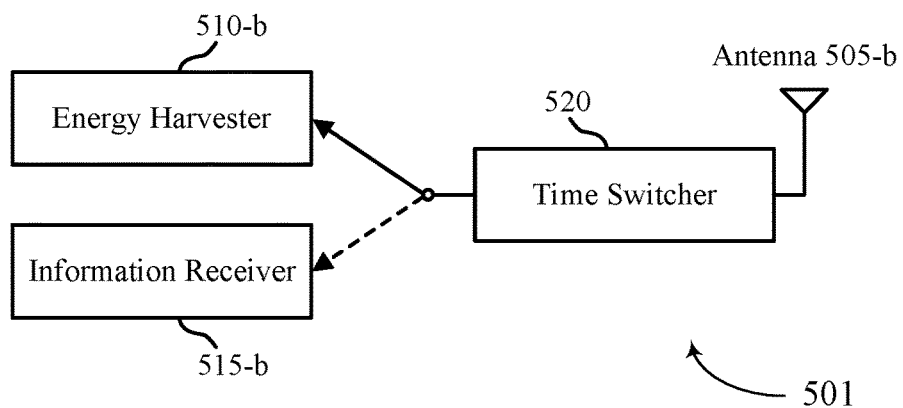
Figure 5:
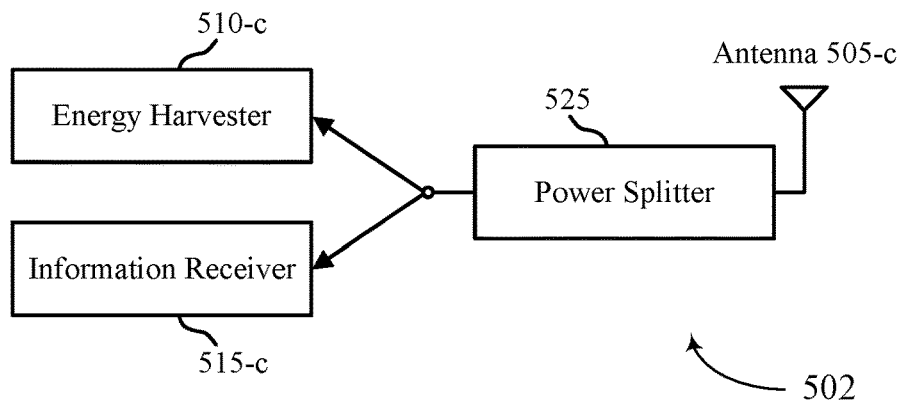

FIG. 5 illustrates examples of energy harvesting schemes 500, 501, and 502 that supports energy harvesting via self-interference in a full-duplex communication mode in accordance with aspects of the present disclosure. The energy harvesting schemes 500, 501, and 502 may implement or be implemented to realize aspects of the wireless communications system 100 or the wireless communications system 200. For example, a UE 115 may implement one or more of the energy harvesting schemes 500, 501, and 502 using self-interference associated with a transmission from the UE 115 in accordance with a full-duplex communication mode, and such a UE 115 may be an example of corresponding devices described herein, including with reference to FIGS. 1 through 4.

In some aspects, the UE 115 may use a harvesting of radio frequency energy to perform one or more tasks or to power one or more components of the UE 115 that perform one or more tasks. Such tasks may include data decoding, data reception, data encoding, or data transmission, among other examples. In some cases, the UE 115 may be unable to charge a cell phone battery in full using energy harvesting, but may be able to charge a battery of a device such as a wearable, a smart watch, other UEs, a lower power device, or a battery that is dedicated for energy harvesting in a way that some tasks may be performed using the harvested energy. For example, tasks such as data decoding, operating some filters, data encoding, or transmitting or receiving data may be done through accumulation of energy over time. Energy harvesting may support a self-sustainable network in which a node in the network may interact with the network using energy harvested in the network through transmissions.

In some cases, the UE 115 may implement one or more of three different types of energy harvesting schemes or techniques, such as the energy harvesting schemes 500, 501, and 502. The energy harvesting scheme 500 may illustrate a separated receiver architecture according to which a set of antennas 505-a of the UE 115 includes a first one or more antennas 505-a that lead to an energy harvester 510-a and a second, separate one or more antennas 505-a that lead to an information receiver 515 (e.g., an information decoder). As such, the UE 115 may use different antennas 505-a for energy harvesting than the UE 115 uses for receiving signaling.

The energy harvesting scheme 501 may illustrate a time-switching architecture according to which an antenna 505-b leads to a time switcher 520 that routes to one of an energy harvester 510-b or an information receiver 515-b (e.g., an information decoder). The time-switching architecture may allow the UE 115 (e.g., a network node) to switch between the information receiver 515-b or the energy harvester 510-b (e.g., a radio frequency energy harvester). The time switcher 520 may allocate time for the energy harvester 510-b as $\alpha T$ and time for the information receiver 515-b as $(1-\alpha)T$, where a is a variable defined as $0 \leq \alpha \leq 1$ and represents a proportion of time allocated to the energy harvester 510-b (e.g., a fraction of time allocated for energy harvesting) and T represents an amount of time or duration of active operation of the antenna 505-b. As such, an energy harvested at a receiver j from a source i may be calculated in accordance with Equation 1.

$$E_j = \eta P_i |g_{i-j}|^2 \alpha T \quad (1)$$

$P_i$ may refer to a transmit power from the source, $|g_{i-j}|^2$ may refer to a communication metric (e.g., such as a metric related to propagation or pathloss), and $\eta$ may refer to another communication metric or a processing metric (e.g., such as a metric related to pathloss or efficiency). Letting $\kappa$ and W denote a noise spectral density and a channel bandwidth, respectively, a data rate at the information receiver 515-b may be given by Equation 2.

$$R_{i-j} = (1-\alpha)\log_2\left(1 + \frac{|g_{i-j}|^2 P_i}{\kappa W}\right) \quad (2)$$

The energy harvesting scheme 502 may illustrate a power-splitting architecture according to which an antenna 505-c leads to a power splitter 525 that splits a received power between an energy harvester 510-c and an information receiver 515-c (e.g., an information decoder). In accordance with the power-splitting architecture, received radio frequency signals may be split into two streams for the information receiver 515-c and the energy harvester 510-c (e.g., a radio frequency energy harvester) with different power levels. For example, the power splitter 525 may split power such that the energy harvester 510-c receives a fraction of power allocated for energy harvesting $\rho$, where $\rho$ is defined such that $0 \leq \rho \leq 1$. Accordingly, the power splitter 525 may allocate a fraction of power $1-\rho$ for information receiving or decoding. As such, an energy harvested at a receiver j from a source i may be calculated in accordance with Equation 3 and a data rate at the information receiver 515-c may be given by Equation 4.

$$E_j = \eta \rho P_i |g_{i-j}|^2 T \quad (3)$$

$$R_{i-j} = \log_2\left(1 + \frac{|g_{i-j}|^2 (1-\rho) P_i}{\kappa W}\right) \quad (4)$$

Figure 6:
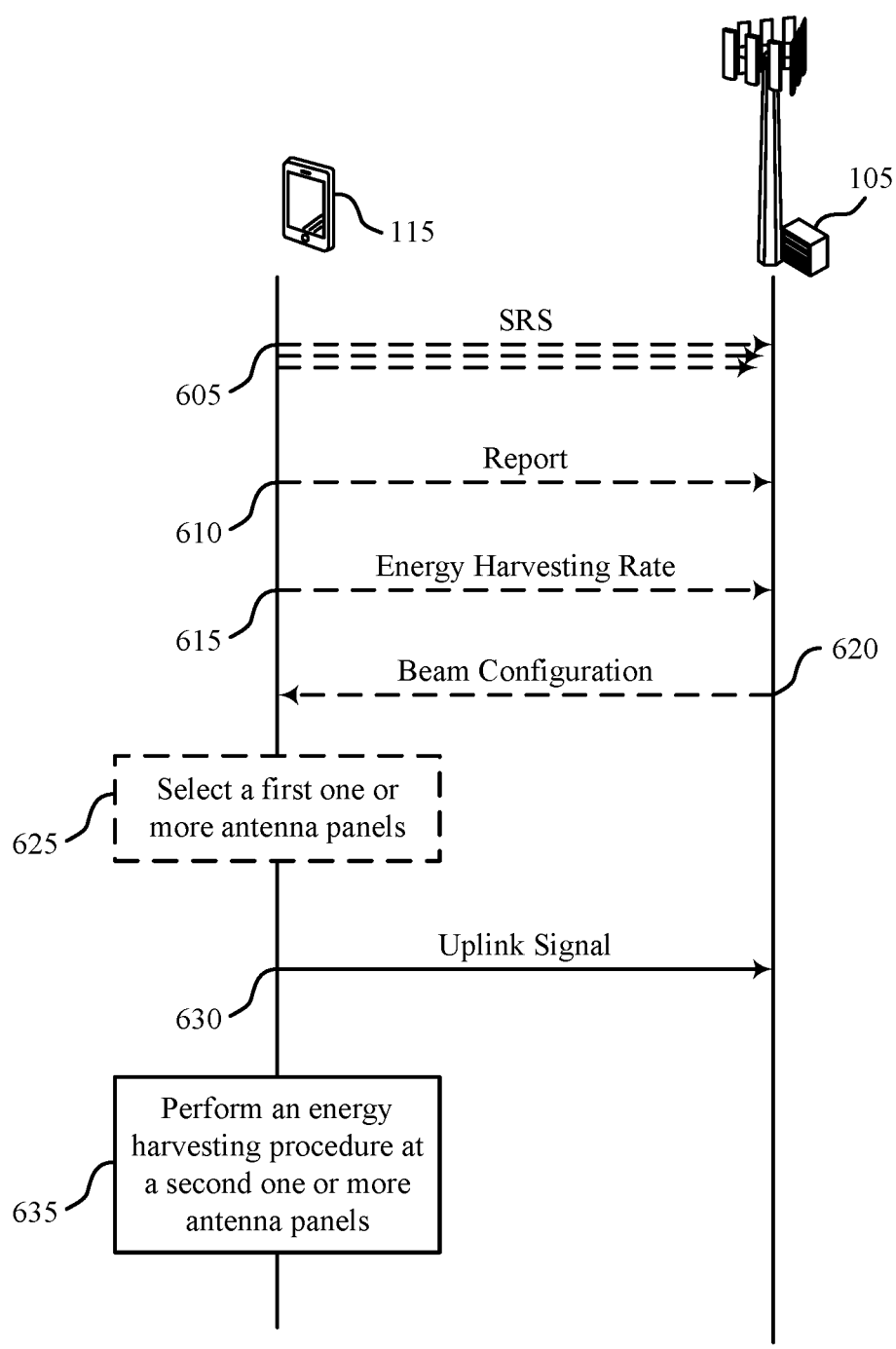
FIG. 6 illustrates an example of a process flow that supports energy harvesting via self-interference in a full-duplex communication mode in accordance with aspects of the present disclosure.

FIG. 6 illustrates an example of a process flow 600 that supports energy harvesting via self-interference in a full-duplex communication mode in accordance with aspects of the present disclosure. The process flow 600 may implement or be implemented to realize one or more aspects of the wireless communications system 100 or the wireless communications system 200. For example, the process flow 600 illustrates communication between a UE 115 and a base station 105, which may be examples of corresponding devices described herein, including with reference to FIGS. 1 through 5. In some examples, the UE 115 may be an example of a full-duplex node and may perform energy harvesting via self-interference. Further, the UE 115 and the base station 105 may perform beam adaptation to achieve a suitable trade-off between uplink coverage and energy harvesting.

In the following description of the process flow 600, the operations may be performed (such as reported or provided) in a different order than the order shown, or the operations performed by the example devices may be performed in different orders or at different times. Some operations also may be left out of the process flow 600, or other operations may be added to the process flow 600. Further, although some operations or signaling may be shown to occur at different times for discussion purposes, these operations may actually occur at the same time.

At 605, the UE 115 may perform a beam sweeping procedure associated with transmitting signaling using a set of directional beams from a first one or more antenna panels of the UE 115 and may measure, at a second one or more antenna panels of the UE 115, a received energy from the signaling for each directional beam of the set of directional beams. For example, the UE 115 may perform an offline or online calibration for the different beams and how much power the UE 115 receives at the receive side. In examples in which the UE 115 performs an online calibration, the UE 115 may use SRSs for the energy harvesting calibration. In such examples, the UE 115 may transmit an SRS via each of the set of directional beams.

At 610, the UE 115 may transmit, to the base station 105, a report indicating the received energy at the second one or more antenna panels from the signaling for each directional beam of the set of directional beams. For example, the UE 115 may transmit the report to the base station 105 conveying information related to the energy harvesting calibration at the UE 115.

At 615, the UE 115 may transmit, to the base station 105, an indication of an energy harvesting rate for operation of one or more components of the UE 115. For example, the UE 115 may transmit a request for an energy harvesting rate that may enable the UE 115 to successfully or completely operate the one or more components.

At 620, the UE 115 may receive, from the base station 105, an indication of a directional beam to use for an uplink signal. In some examples, the base station 105 may select the directional beam based on the report and a receive power (e.g., a signal strength) at the base station 105 of signaling transmitted via the directional beam. Additionally or alternatively, the base station 105 may select the directional beam based on the report and the energy harvesting rate for the operation of the one or more components of the UE 115. As such, the base station 105 may select and indicate a directional beam for the UE 115 to use for the uplink signal with consideration to both the energy harvesting at the UE 115 and an uplink coverage associated with the transmission of the uplink signal. Additionally or alternatively, the UE 115 may receive a control signal associated with a CG that indicates a first directional beam for CG uplink transmissions with energy harvesting and a second directional beam for CG uplink transmissions without energy harvesting. In some aspects, the uplink signal may be an example of a CG uplink transmission with energy harvesting.

At 625, the UE 115 may select the first one or more antenna panels of the UE 115 for the transmitting of the uplink signal and the second one or more antenna panels for the receiving of the self-interference associated with the uplink signal. In some examples, the UE 115 may make the selection such that a physical separation between the first one or more antenna panels and the second one or more antenna panels is less than a threshold physical separation.

At 630, the UE 115 may transmit, via the first one or more antenna panels of the UE, the uplink signal in accordance with a full-duplex communication mode of the UE 115. For example, while transmitting the uplink signal via the first one or more panels of the UE 115, the UE 115 may also actively operate the second one or more antenna panels of the UE 115 for reception. Accordingly, the UE 115 may receive, at the second one or more antenna panels of the UE 115, self-interference associated with the uplink signal.

At 635, the UE 115 may perform an energy harvesting procedure at the second one or more antenna panels using the self-interference associated with the uplink signal. In some examples, the UE 115 may use the harvested energy to power or operate the one or more components of the UE 115 or to perform one or more tasks at the UE 115.

Figure 7:
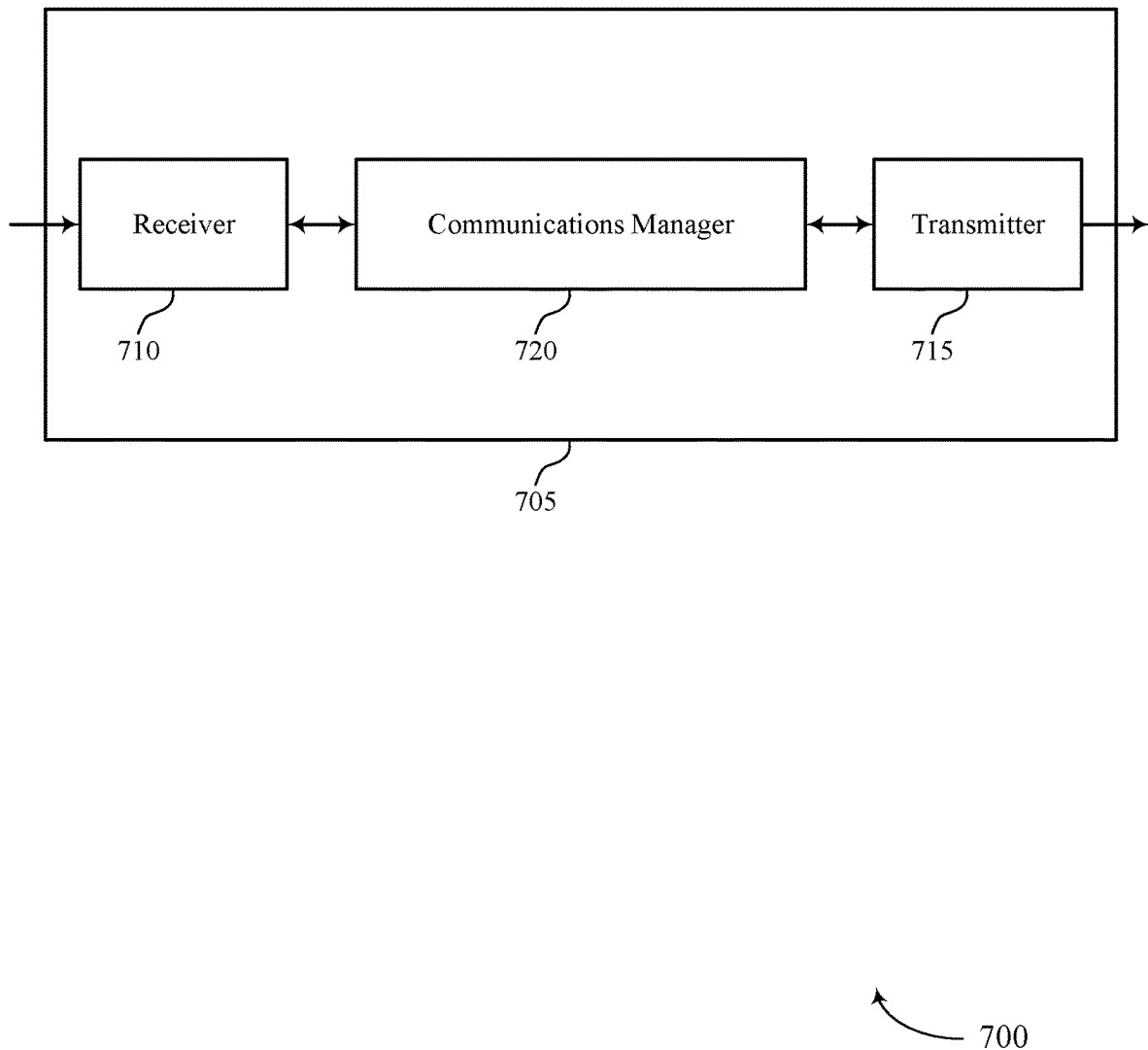
FIGS. 7 and 8 show block diagrams of devices that support energy harvesting via self-interference in a full-duplex communication mode in accordance with aspects of the present disclosure.

FIG. 7 shows a block diagram 700 of a device 705 that supports energy harvesting via self-interference in a full-duplex communication mode in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to energy harvesting via self-interference in a full-duplex communication mode). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to energy harvesting via self-interference in a full-duplex communication mode). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of energy harvesting via self-interference in a full-duplex communication mode as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. For example, the communications manager 720 may be configured as or otherwise support a means for transmitting, via a first one or more antenna panels of the UE, an uplink signal in accordance with a full-duplex communication mode of the UE. The communications manager 720 may be configured as or otherwise support a means for receiving, at a second one or more antenna panels of the UE, self-interference associated with the uplink signal. The communications manager 720 may be configured as or otherwise support a means for performing an energy harvesting procedure at the second one or more antenna panels using the self-interference associated with the uplink signal.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for reduced processing, reduced power consumption, and more efficient utilization of communication resources.

Figure 8:
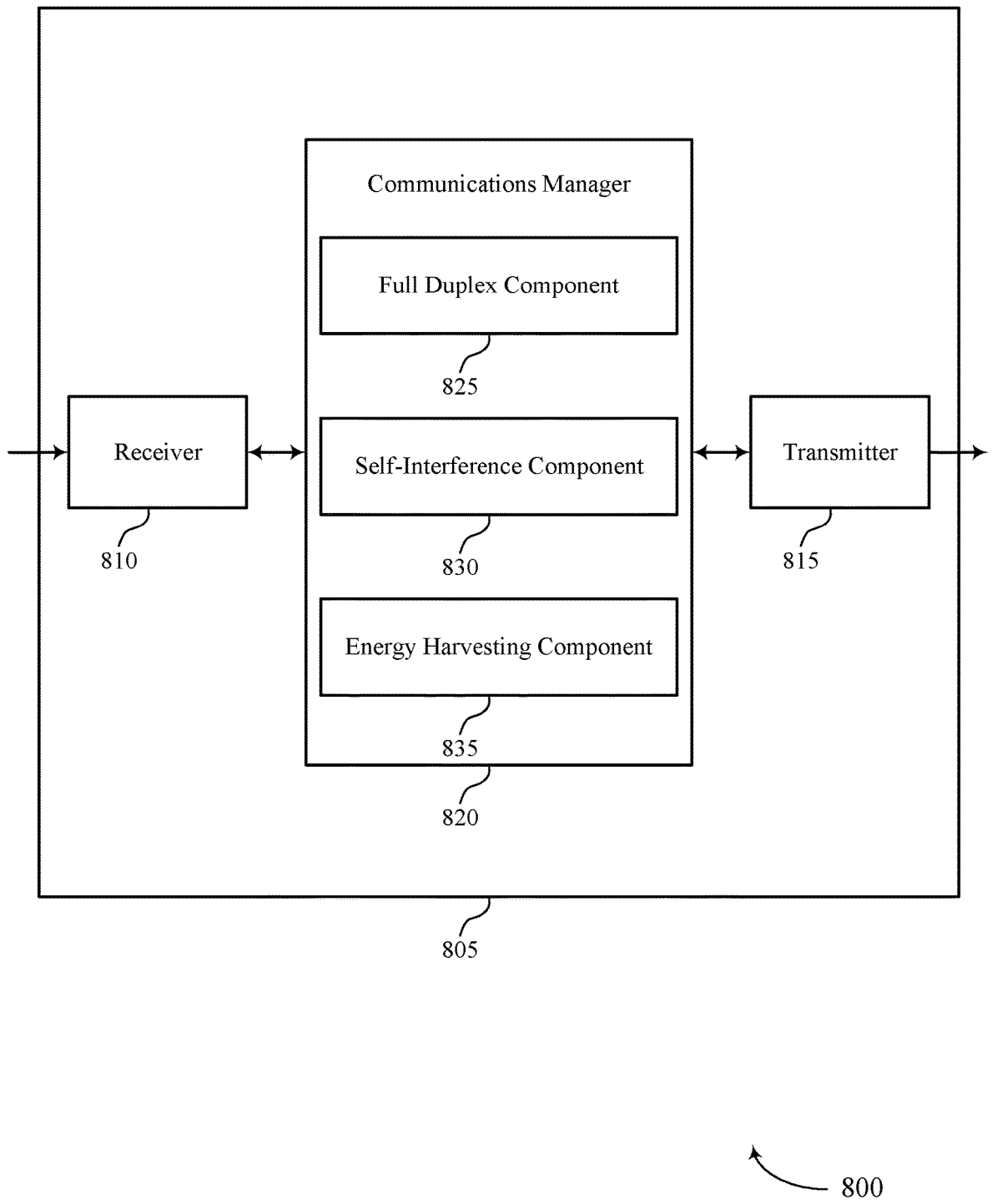

FIG. 8 shows a block diagram 800 of a device 805 that supports energy harvesting via self-interference in a full-duplex communication mode in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to energy harvesting via self-interference in a full-duplex communication mode). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to energy harvesting via self-interference in a full-duplex communication mode). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of energy harvesting via self-interference in a full-duplex communication mode as described herein. For example, the communications manager 820 may include a full-duplex component 825, a self-interference component 830, an energy harvesting component 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. The full-duplex component 825 may be configured as or otherwise support a means for transmitting, via a first one or more antenna panels of the UE, an uplink signal in accordance with a full-duplex communication mode of the UE. The self-interference component 830 may be configured as or otherwise support a means for receiving, at a second one or more antenna panels of the UE, self-interference associated with the uplink signal. The energy harvesting component 835 may be configured as or otherwise support a means for performing an energy harvesting procedure at the second one or more antenna panels using the self-interference associated with the uplink signal.

Figure 9:
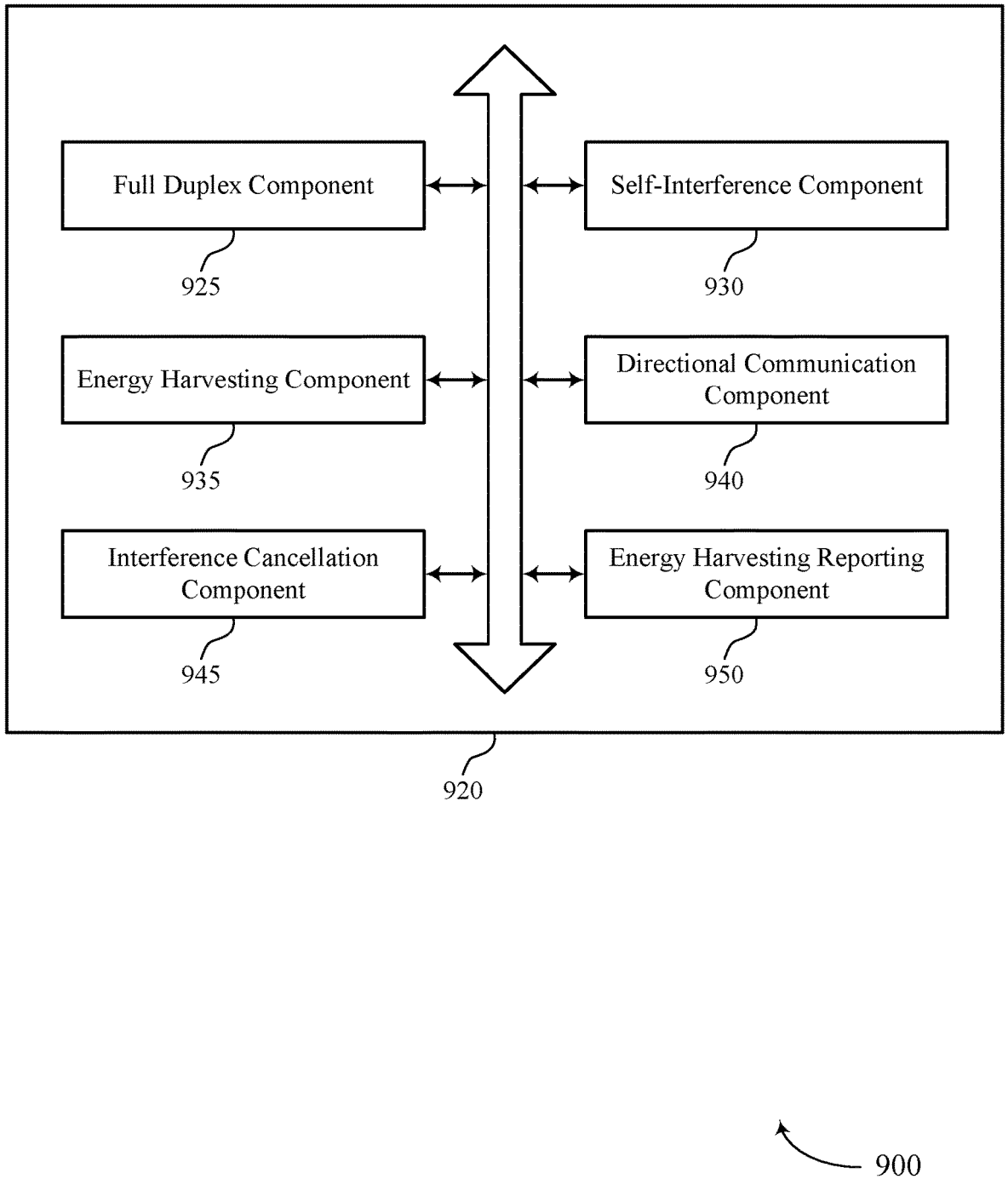
FIG. 9 shows a block diagram of a communications manager that supports energy harvesting via self-interference in a full-duplex communication mode in accordance with aspects of the present disclosure.

FIG. 9 shows a block diagram 900 of a communications manager 920 that supports energy harvesting via self-interference in a full-duplex communication mode in accordance with aspects of the present disclosure. The communications manager 920 may be an example of aspects of a communications manager 720, a communications manager 820, or both, as described herein. The communications manager 920, or various components thereof, may be an example of means for performing various aspects of energy harvesting via self-interference in a full-duplex communication mode as described herein. For example, the communications manager 920 may include a full-duplex component 925, a self-interference component 930, an energy harvesting component 935, a directional communication component 940, an interference cancellation component 945, an energy harvesting reporting component 950, or any combination thereof. Each of these components may communicate, directly or indirectly, with one another (e.g., via one or more buses).

The communications manager 920 may support wireless communication at a UE in accordance with examples as disclosed herein. The full-duplex component 925 may be configured as or otherwise support a means for transmitting, via a first one or more antenna panels of the UE, an uplink signal in accordance with a full-duplex communication mode of the UE. The self-interference component 930 may be configured as or otherwise support a means for receiving, at a second one or more antenna panels of the UE, self-interference associated with the uplink signal. The energy harvesting component 935 may be configured as or otherwise support a means for performing an energy harvesting procedure at the second one or more antenna panels using the self-interference associated with the uplink signal.

In some examples, the directional communication component 940 may be configured as or otherwise support a means for performing a beam sweeping procedure associated with transmitting signaling using a set of directional beams from the first one or more antenna panels. In some examples, the self-interference component 930 may be configured as or otherwise support a means for measuring, at the second one or more antenna panels, a received energy from the signaling for each directional beam of the set of directional beams.

In some examples, the energy harvesting reporting component 950 may be configured as or otherwise support a means for transmitting, to a base station, a report indicating the received energy at the second one or more antenna panels from the signaling for each directional beam of the set of directional beams.

In some examples, the directional communication component 940 may be configured as or otherwise support a means for receiving, from the base station, an indication of a first directional beam to use for the uplink signal based on the report and a receive power at the base station of signaling transmitted via the first directional beam, where the UE transmits the uplink signal using the directional beam based on receiving the indication.

In some examples, the energy harvesting component 935 may be configured as or otherwise support a means for transmitting, to the base station, an indication of an energy harvesting rate for operation of one or more components of the UE. In some examples, the directional communication component 940 may be configured as or otherwise support a means for receiving, from the base station, an indication of a first directional beam to use for the uplink signal based on the report and the energy harvesting rate for the operation of the one or more components of the UE, where the UE transmits the uplink signal using the first directional beam based on receiving the indication.

In some examples, the directional communication component 940 may be configured as or otherwise support a means for receiving, from a base station, a control signal associated with a configured grant that indicates a first directional beam for configured grant uplink transmissions with energy harvesting and a second directional beam for configured grant uplink transmissions without energy harvesting, where the uplink signal includes a configured grant uplink transmission with energy harvesting.

In some examples, the UE performs the configured grant uplink transmissions with energy harvesting using the first directional beam during time periods without simultaneous downlink reception and performs the configured grant uplink transmissions without energy harvesting using the second directional beam during time periods with simultaneous downlink reception.

In some examples, the interference cancellation component 945 may be configured as or otherwise support a means for refraining from applying interference cancellation associated with the uplink signal at the second one or more antenna panels, where performing the energy harvesting procedure is based on refraining from applying the interference cancellation associated with the uplink signal.

In some examples, the full-duplex component 925 may be configured as or otherwise support a means for selecting the first one or more antenna panels for the transmitting of the uplink signal and the second one or more antenna panels for the receiving of the self-interference associated with the uplink signal such that a physical separation between the first one or more antenna panels and the second one or more antenna panels is less than a threshold physical separation.

In some examples, the UE transmits the uplink signal during a time period without simultaneous downlink reception. In some examples, the full-duplex communication mode of the UE is associated with active operation of the first one or more antenna panels for transmission and active operation of the second one or more antenna panels for energy harvesting.

Figure 10:
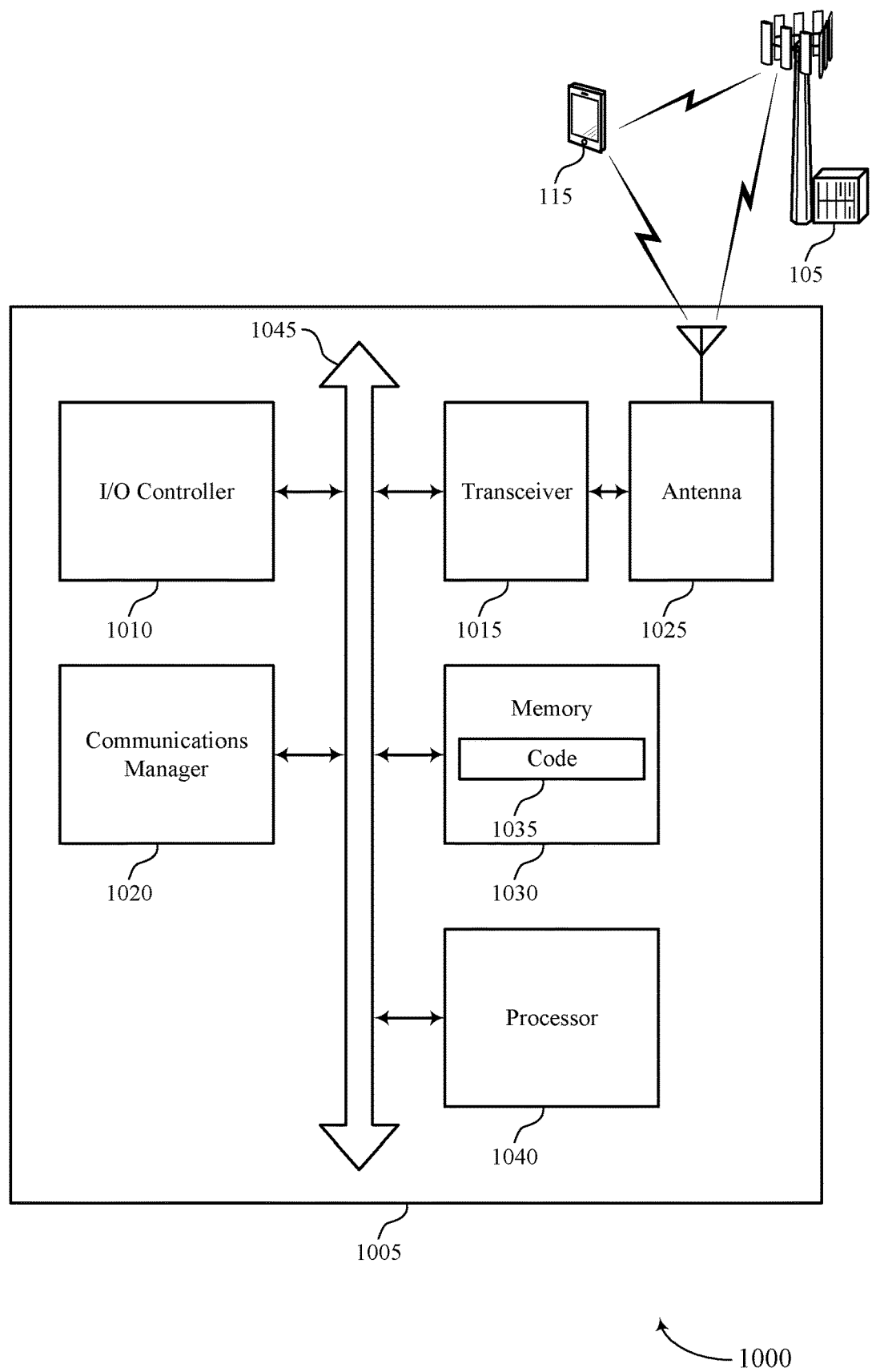
FIG. 10 shows a diagram of a system including a device that supports energy harvesting via self-interference in a full-duplex communication mode in accordance with aspects of the present disclosure.

FIG. 10 shows a diagram of a system 1000 including a device 1005 that supports energy harvesting via self-interference in a full-duplex communication mode in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting energy harvesting via self-interference in a full-duplex communication mode). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for transmitting, via a first one or more antenna panels of the UE, an uplink signal in accordance with a full-duplex communication mode of the UE. The communications manager 1020 may be configured as or otherwise support a means for receiving, at a second one or more antenna panels of the UE, self-interference associated with the uplink signal. The communications manager 1020 may be configured as or otherwise support a means for performing an energy harvesting procedure at the second one or more antenna panels using the self-interference associated with the uplink signal.

By including or configuring the communications manager 1020 in accordance with examples as described herein, the device 1005 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of energy harvesting via self-interference in a full-duplex communication mode as described herein, or the processor 1040 and the memory 1030 may be otherwise configured to perform or support such operations.

Figure 11:
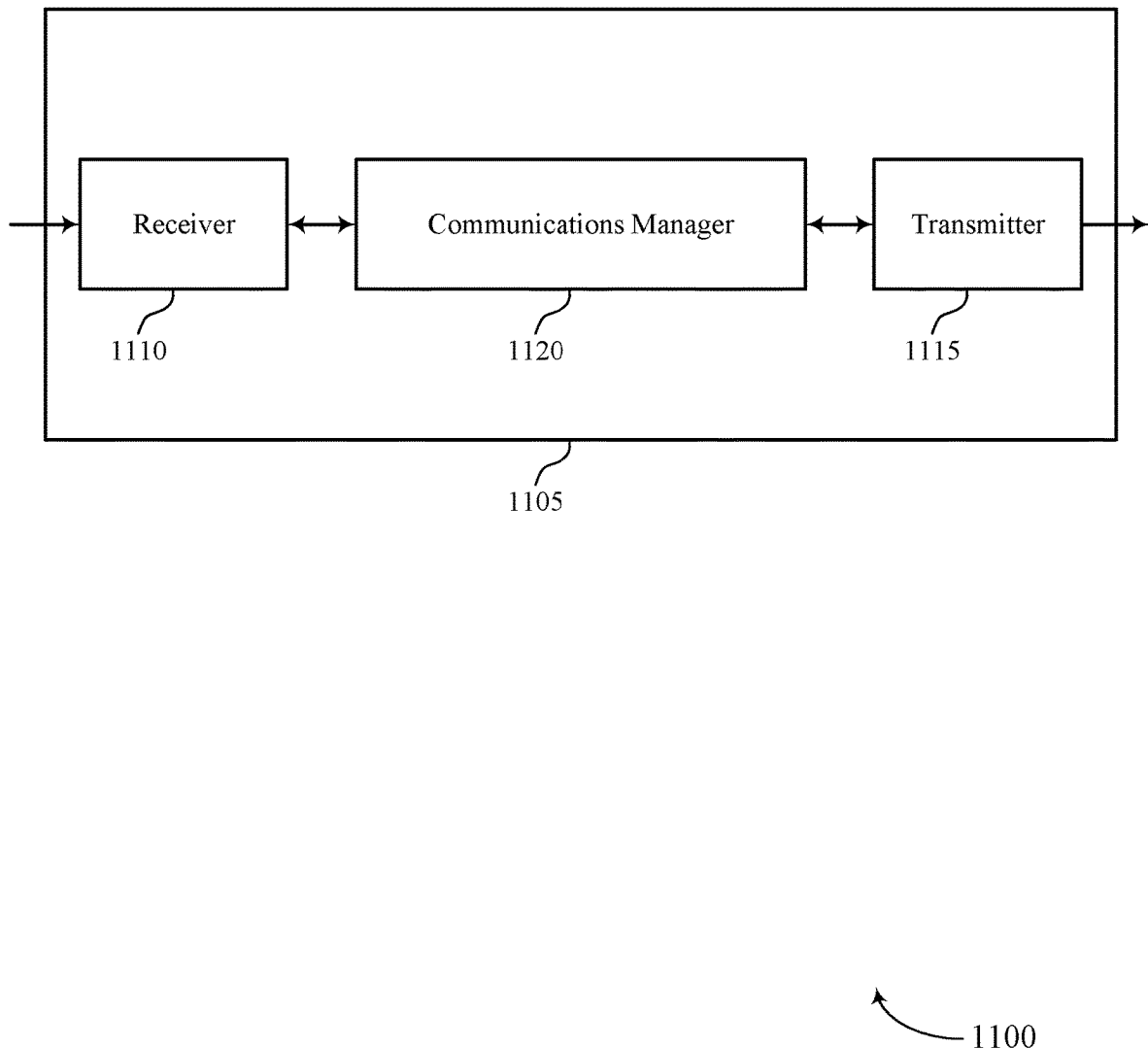
FIGS. 11 and 12 show block diagrams of devices that support energy harvesting via self-interference in a full-duplex communication mode in accordance with aspects of the present disclosure.

FIG. 11 shows a block diagram 1100 of a device 1105 that supports energy harvesting via self-interference in a full-duplex communication mode in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to energy harvesting via self-interference in a full-duplex communication mode). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to energy harvesting via self-interference in a full-duplex communication mode). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of energy harvesting via self-interference in a full-duplex communication mode as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. For example, the communications manager 1120 may be configured as or otherwise support a means for receiving, from a UE, a report indicating, for each directional beam of a set of directional beams transmitted using a first one or more antenna panels of the UE, a received energy at a second one or more antenna panels of the UE from self-interference associated with transmissions from the first one or more antenna panels. The communications manager 1120 may be configured as or otherwise support a means for transmitting, to the UE, an indication of a first directional beam from the set of directional beams for the UE to use for an uplink signal from the first one or more antenna panels of the UE based on the report and on whether the UE is to perform an energy harvesting procedure during transmission of the uplink signal. The communications manager 1120 may be configured as or otherwise support a means for receiving, from the UE, the uplink signal via the first directional beam.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for reduced processing, reduced power consumption, and more efficient utilization of communication resources.

Figure 12:
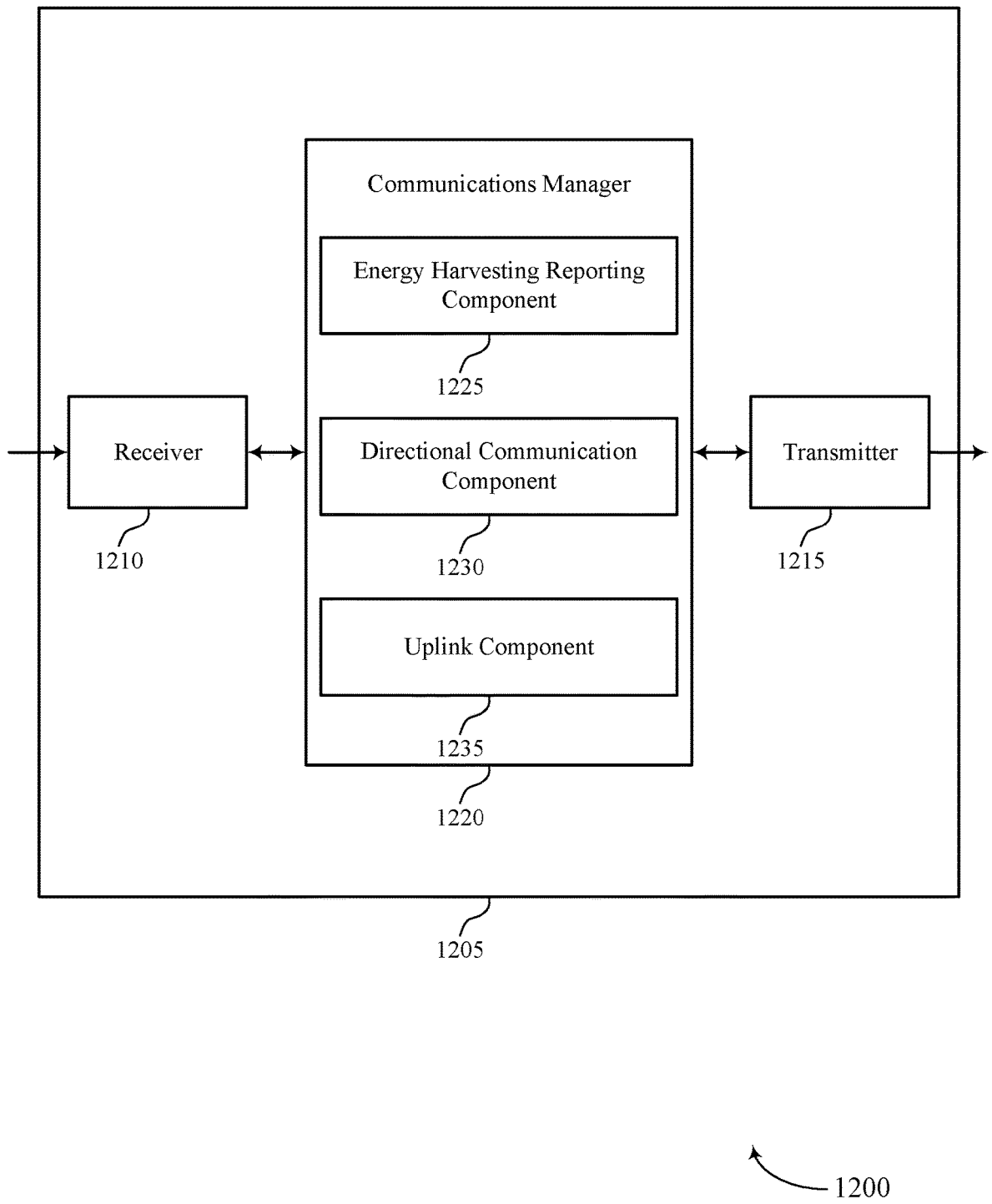

FIG. 12 shows a block diagram 1200 of a device 1205 that supports energy harvesting via self-interference in a full-duplex communication mode in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to energy harvesting via self-interference in a full-duplex communication mode). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to energy harvesting via self-interference in a full-duplex communication mode). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of energy harvesting via self-interference in a full-duplex communication mode as described herein. For example, the communications manager 1220 may include an energy harvesting reporting component 1225, a directional communication component 1230, an uplink component 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a base station in accordance with examples as disclosed herein. The energy harvesting reporting component 1225 may be configured as or otherwise support a means for receiving, from a UE, a report indicating, for each directional beam of a set of directional beams transmitted using a first one or more antenna panels of the UE, a received energy at a second one or more antenna panels of the UE from self-interference associated with transmissions from the first one or more antenna panels. The directional communication component 1230 may be configured as or otherwise support a means for transmitting, to the UE, an indication of a first directional beam from the set of directional beams for the UE to use for an uplink signal from the first one or more antenna panels of the UE based on the report and on whether the UE is to perform an energy harvesting procedure during transmission of the uplink signal. The uplink component 1235 may be configured as or otherwise support a means for receiving, from the UE, the uplink signal via the first directional beam.

Figure 13:
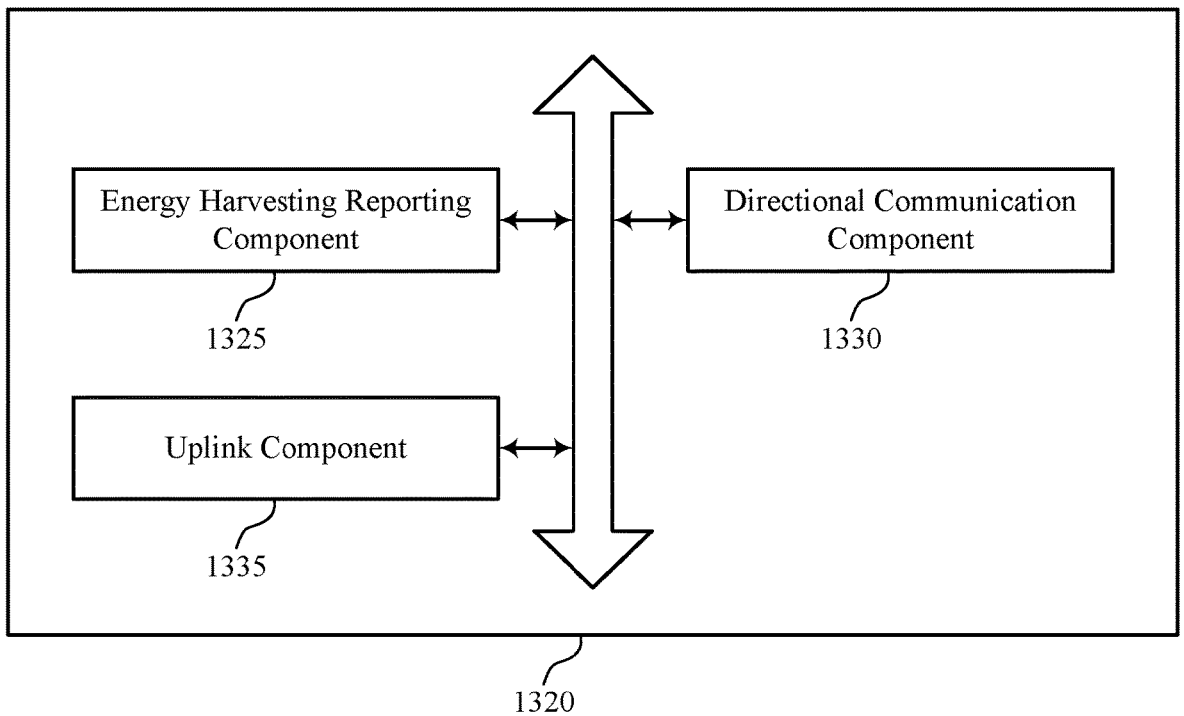
FIG. 13 shows a block diagram of a communications manager that supports energy harvesting via self-interference in a full-duplex communication mode in accordance with aspects of the present disclosure.

FIG. 13 shows a block diagram 1300 of a communications manager 1320 that supports energy harvesting via self-interference in a full-duplex communication mode in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of energy harvesting via self-interference in a full-duplex communication mode as described herein. For example, the communications manager 1320 may include an energy harvesting reporting component 1325, a directional communication component 1330, an uplink component 1335, or any combination thereof. Each of these components may communicate, directly or indirectly, with one another (e.g., via one or more buses).

The communications manager 1320 may support wireless communication at a base station in accordance with examples as disclosed herein. The energy harvesting reporting component 1325 may be configured as or otherwise support a means for receiving, from a UE, a report indicating, for each directional beam of a set of directional beams transmitted using a first one or more antenna panels of the UE, a received energy at a second one or more antenna panels of the UE from self-interference associated with transmissions from the first one or more antenna panels. The directional communication component 1330 may be configured as or otherwise support a means for transmitting, to the UE, an indication of a first directional beam from the set of directional beams for the UE to use for an uplink signal from the first one or more antenna panels of the UE based on the report and on whether the UE is to perform an energy harvesting procedure during transmission of the uplink signal. The uplink component 1335 may be configured as or otherwise support a means for receiving, from the UE, the uplink signal via the first directional beam.

In some examples, the energy harvesting reporting component 1325 may be configured as or otherwise support a means for receiving, from the UE, an indication of an energy harvesting rate for operation of one or more components of the UE, where transmitting the indication of the first directional beam to use for the uplink signal from the first one or more antenna panels of the UE is based on the report and the energy harvesting rate for the operation of the one or more components of the UE.

In some examples, the directional communication component 1330 may be configured as or otherwise support a means for transmitting, to the UE, a control signal associated with a configured grant that indicates the first directional beam for configured grant uplink transmissions with energy harvesting and a second directional beam for configured grant uplink transmissions without energy harvesting, where the uplink signal includes a configured grant uplink transmission with energy harvesting.

In some examples, the base station receives the configured grant uplink transmissions with energy harvesting via the first directional beam during time periods without simultaneous transmission to the UE and receives the configured grant uplink transmissions without energy harvesting via the second directional beam during time periods with simultaneous transmission to the UE.

In some examples, the directional communication component 1330 may be configured as or otherwise support a means for selecting the first directional beam for the UE to use for the uplink signal from the first one or more antenna panels of the UE based on the report, whether the UE is to perform the energy harvesting procedure during the transmission of the uplink signal, and a receive power at the base station of signaling transmitted via the set of directional beams, where transmitting the indication of the first directional beam is based on the selecting.

In some examples, the base station receives the uplink signal during a time period without simultaneous downlink transmission to the UE. In some examples, the UE is to perform the energy harvesting procedure during the time period based on the time period being without the simultaneous downlink transmission to the UE.

Figure 14:
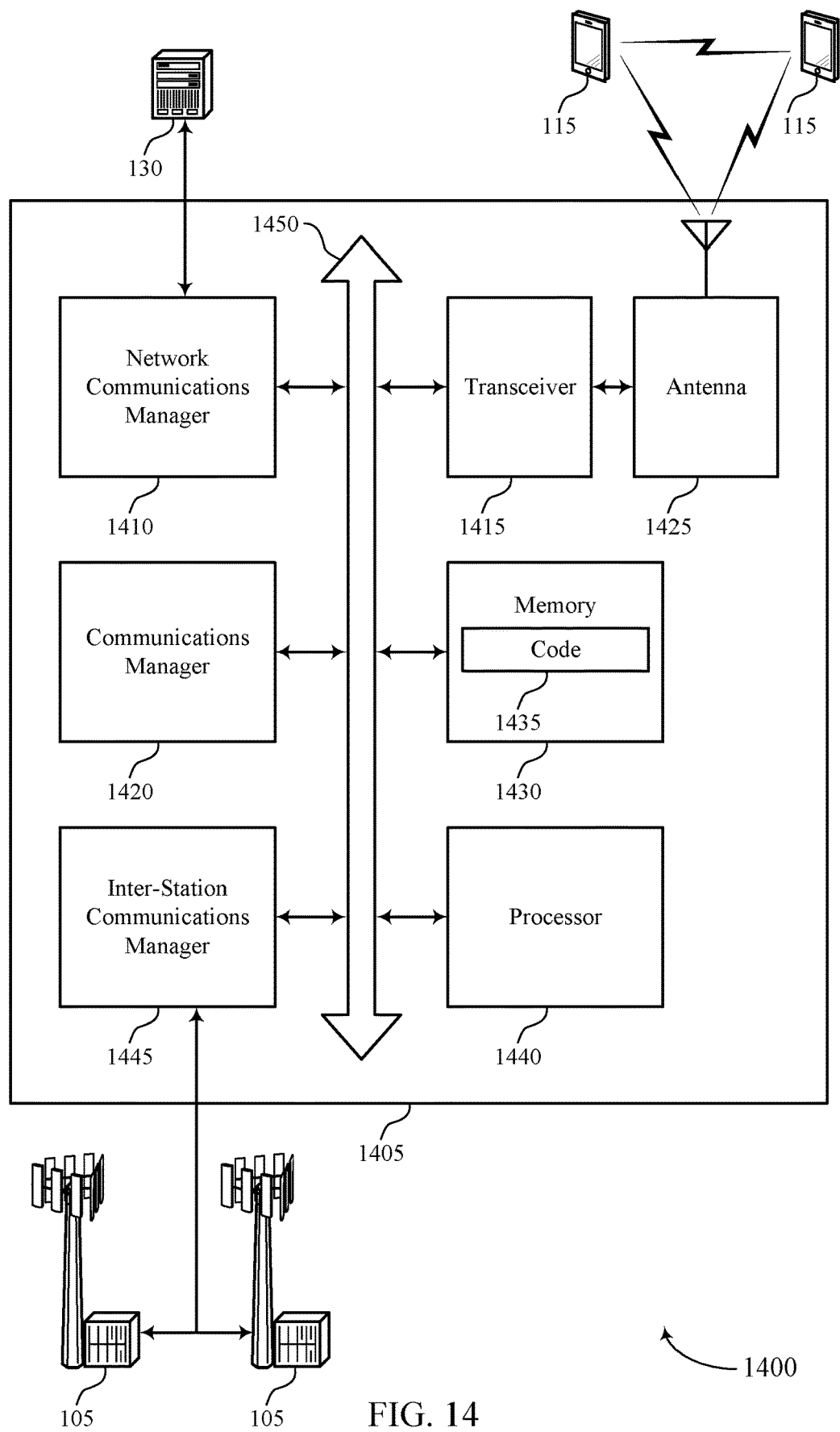
FIG. 14 shows a diagram of a system including a device that supports energy harvesting via self-interference in a full-duplex communication mode in accordance with aspects of the present disclosure.

FIG. 14 shows a diagram of a system 1400 including a device 1405 that supports energy harvesting via self-interference in a full-duplex communication mode in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting energy harvesting via self-interference in a full-duplex communication mode). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communication at a base station in accordance with examples as disclosed herein. For example, the communications manager 1420 may be configured as or otherwise support a means for receiving, from a UE, a report indicating, for each directional beam of a set of directional beams transmitted using a first one or more antenna panels of the UE, a received energy at a second one or more antenna panels of the UE from self-interference associated with transmissions from the first one or more antenna panels. The communications manager 1420 may be configured as or otherwise support a means for transmitting, to the UE, an indication of a first directional beam from the set of directional beams for the UE to use for an uplink signal from the first one or more antenna panels of the UE based on the report and on whether the UE is to perform an energy harvesting procedure during transmission of the uplink signal. The communications manager 1420 may be configured as or otherwise support a means for receiving, from the UE, the uplink signal via the first directional beam.

By including or configuring the communications manager 1420 in accordance with examples as described herein, the device 1405 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of energy harvesting via self-interference in a full-duplex communication mode as described herein, or the processor 1440 and the memory 1430 may be otherwise configured to perform or support such operations.

Figure 15:
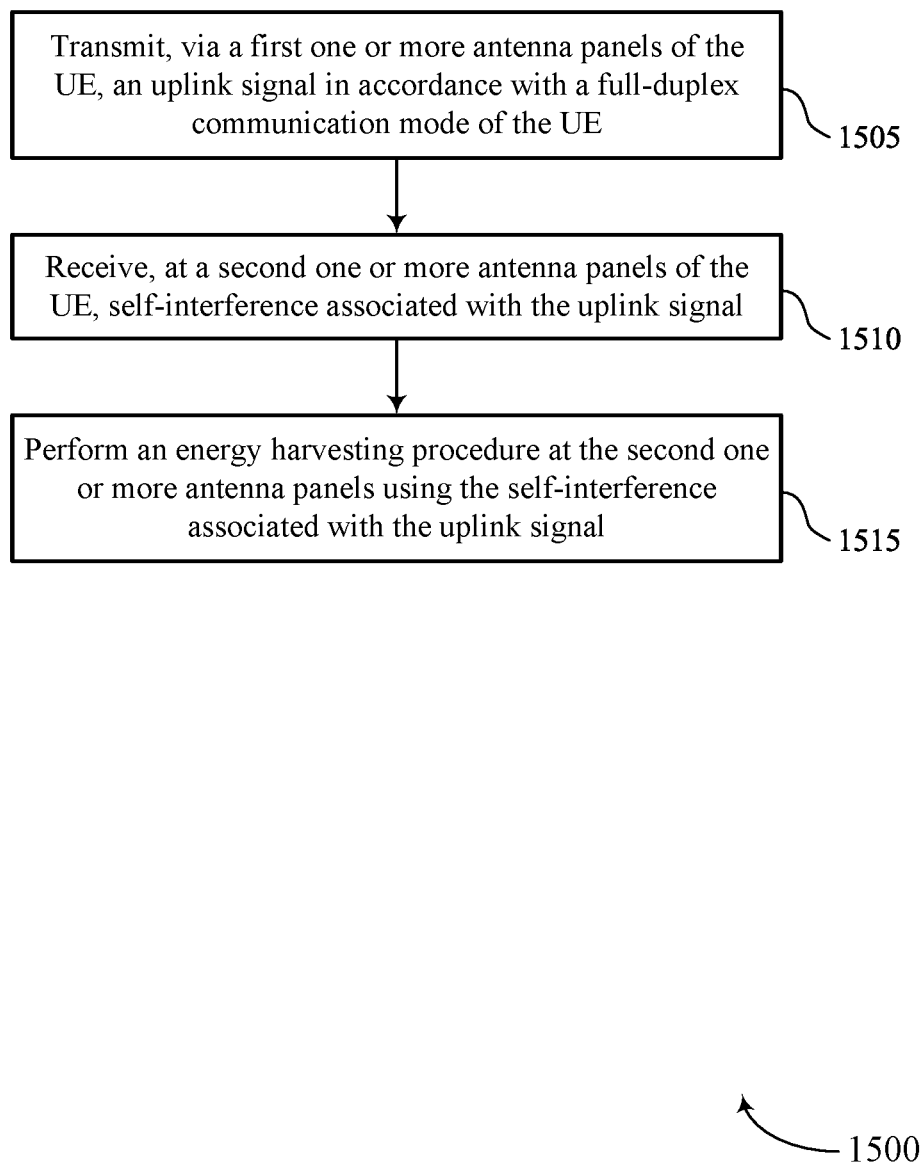
FIGS. 15 through 18 show flowcharts illustrating methods that support energy harvesting via self-interference in a full-duplex communication mode in accordance with aspects of the present disclosure.

FIG. 15 shows a flowchart illustrating a method 1500 that supports energy harvesting via self-interference in a full-duplex communication mode in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include transmitting, via a first one or more antenna panels of the UE, an uplink signal in accordance with a full-duplex communication mode of the UE. The operations of 1505 may be performed in accordance with examples as disclosed herein. In some examples, aspects of the operations of 1505 may be performed by a full-duplex component 925 as described with reference to FIG. 9.

At 1510, the method may include receiving, at a second one or more antenna panels of the UE, self-interference associated with the uplink signal. The operations of 1510 may be performed in accordance with examples as disclosed herein. In some examples, aspects of the operations of 1510 may be performed by a self-interference component 930 as described with reference to FIG. 9.

At 1515, the method may include performing an energy harvesting procedure at the second one or more antenna panels using the self-interference associated with the uplink signal. The operations of 1515 may be performed in accordance with examples as disclosed herein. In some examples, aspects of the operations of 1515 may be performed by an energy harvesting component 935 as described with reference to FIG. 9.

Figure 16:
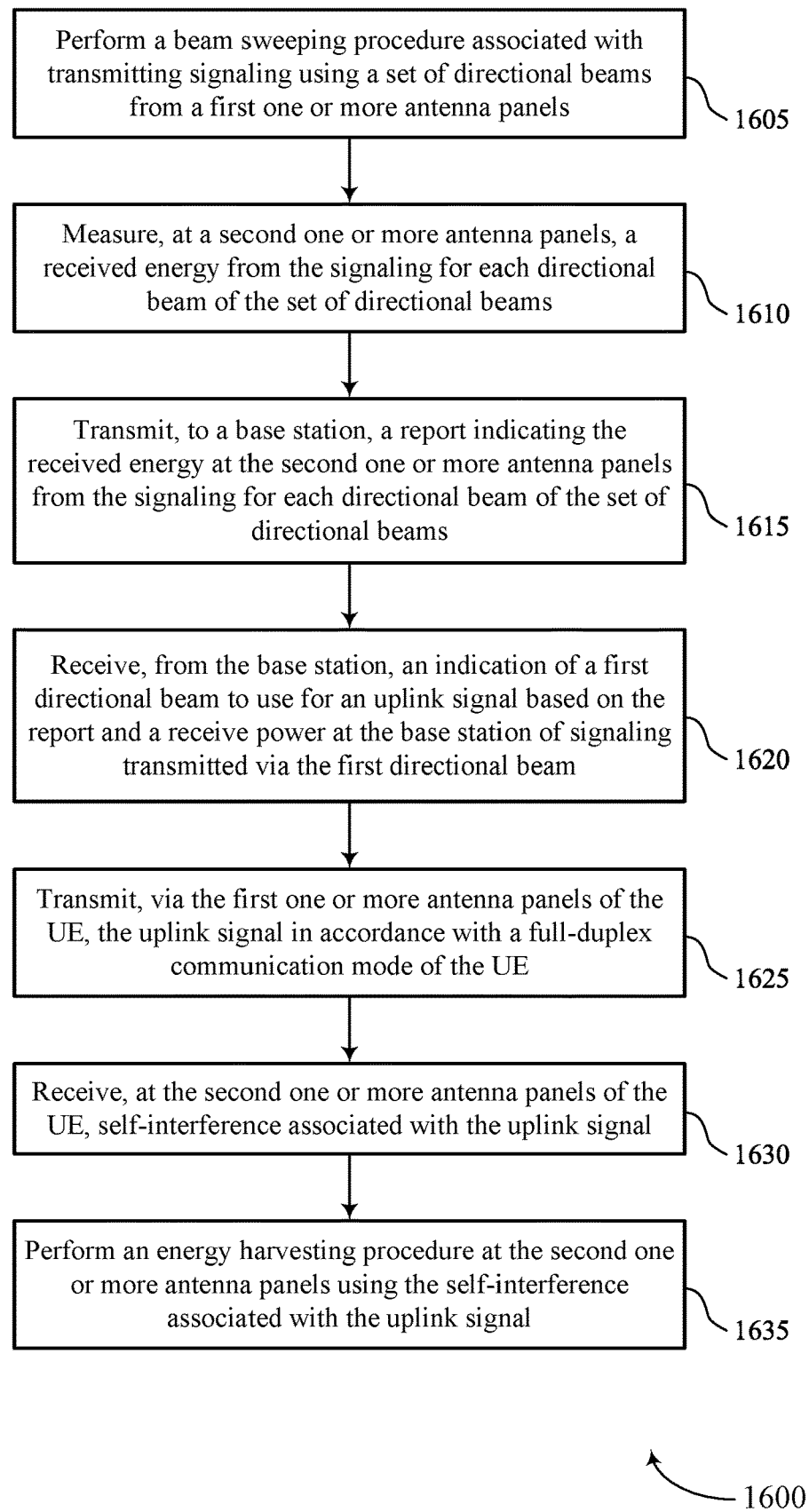

FIG. 16 shows a flowchart illustrating a method 1600 that supports energy harvesting via self-interference in a full-duplex communication mode in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include performing a beam sweeping procedure associated with transmitting signaling using a set of directional beams from a first one or more antenna panels. The operations of 1605 may be performed in accordance with examples as disclosed herein. In some examples, aspects of the operations of 1605 may be performed by a directional communication component 940 as described with reference to FIG. 9.

At 1610, the method may include measuring, at a second one or more antenna panels, a received energy from the signaling for each directional beam of the set of directional beams. The operations of 1610 may be performed in accordance with examples as disclosed herein. In some examples, aspects of the operations of 1610 may be performed by a self-interference component 930 as described with reference to FIG. 9.

At 1615, the method may include transmitting, to a base station, a report indicating the received energy at the second one or more antenna panels from the signaling for each directional beam of the set of directional beams. The operations of 1615 may be performed in accordance with examples as disclosed herein. In some examples, aspects of the operations of 1615 may be performed by an energy harvesting reporting component 950 as described with reference to FIG. 9.

At 1620, the method may include receiving, from the base station, an indication of a first directional beam to use for an uplink signal based on the report and a receive power at the base station of signaling transmitted via the first directional beam. The operations of 1620 may be performed in accordance with examples as disclosed herein. In some examples, aspects of the operations of 1620 may be performed by a directional communication component 940 as described with reference to FIG. 9.

At 1625, the method may include transmitting, via the first one or more antenna panels of the UE, the uplink signal in accordance with a full-duplex communication mode of the UE. The operations of 1625 may be performed in accordance with examples as disclosed herein. In some examples, aspects of the operations of 1625 may be performed by a full-duplex component 925 as described with reference to FIG. 9.

At 1630, the method may include receiving, at the second one or more antenna panels of the UE, self-interference associated with the uplink signal. The operations of 1630 may be performed in accordance with examples as disclosed herein. In some examples, aspects of the operations of 1630 may be performed by a self-interference component 930 as described with reference to FIG. 9.

At 1635, the method may include performing an energy harvesting procedure at the second one or more antenna panels using the self-interference associated with the uplink signal. The operations of 1635 may be performed in accordance with examples as disclosed herein. In some examples, aspects of the operations of 1635 may be performed by an energy harvesting component 935 as described with reference to FIG. 9.

Figure 17:
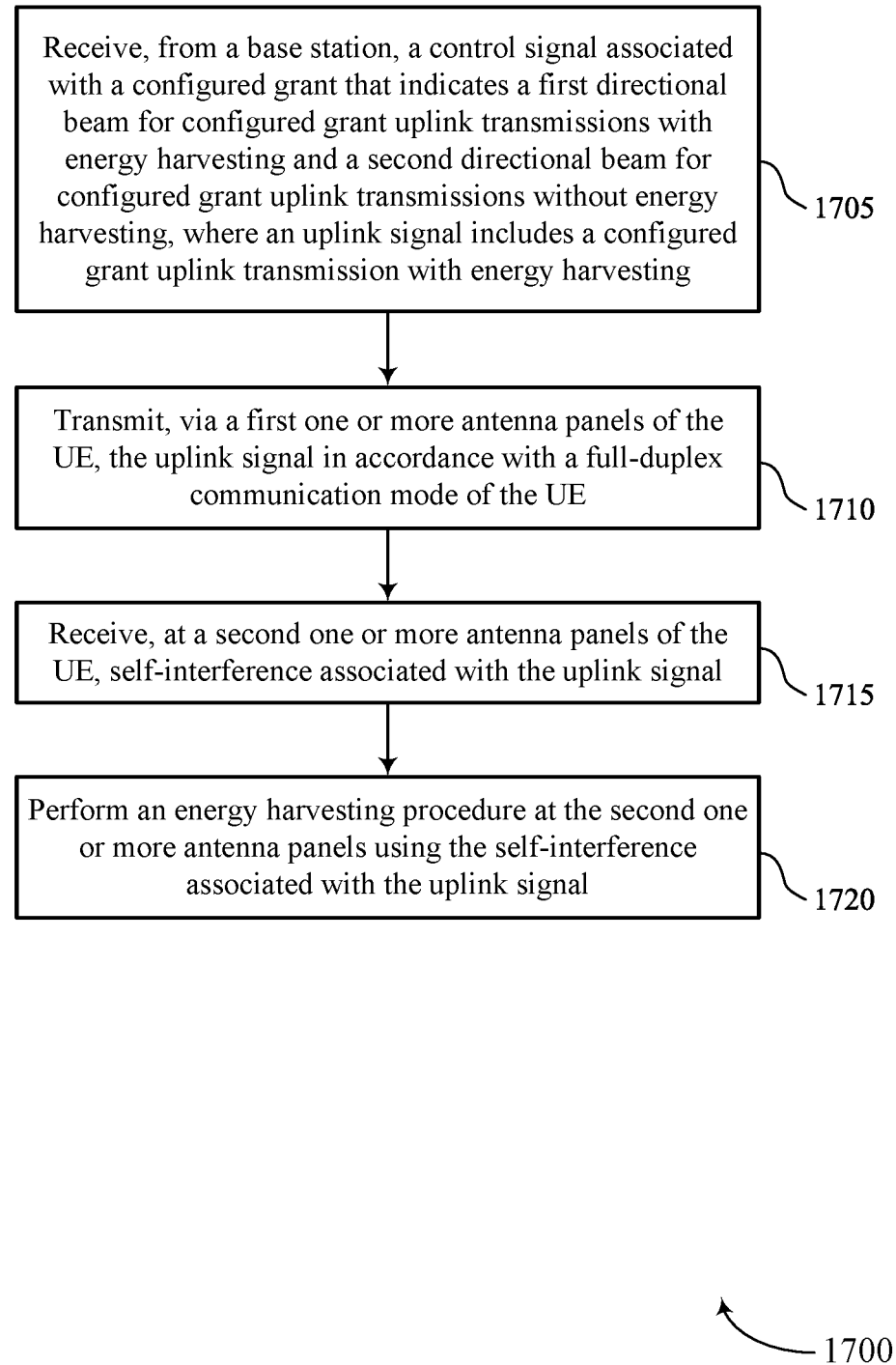

FIG. 17 shows a flowchart illustrating a method 1700 that supports energy harvesting via self-interference in a full-duplex communication mode in accordance with aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1705, the method may include receiving, from a base station, a control signal associated with a configured grant that indicates a first directional beam for configured grant uplink transmissions with energy harvesting and a second directional beam for configured grant uplink transmissions without energy harvesting, where an uplink signal includes a configured grant uplink transmission with energy harvesting. The operations of 1705 may be performed in accordance with examples as disclosed herein. In some examples, aspects of the operations of 1705 may be performed by a directional communication component 940 as described with reference to FIG. 9.

At 1710, the method may include transmitting, via a first one or more antenna panels of the UE, the uplink signal in accordance with a full-duplex communication mode of the UE. The operations of 1710 may be performed in accordance with examples as disclosed herein. In some examples, aspects of the operations of 1710 may be performed by a full-duplex component 925 as described with reference to FIG. 9.

At 1715, the method may include receiving, at a second one or more antenna panels of the UE, self-interference associated with the uplink signal. The operations of 1715 may be performed in accordance with examples as disclosed herein. In some examples, aspects of the operations of 1715 may be performed by a self-interference component 930 as described with reference to FIG. 9.

At 1720, the method may include performing an energy harvesting procedure at the second one or more antenna panels using the self-interference associated with the uplink signal. The operations of 1720 may be performed in accordance with examples as disclosed herein. In some examples, aspects of the operations of 1720 may be performed by an energy harvesting component 935 as described with reference to FIG. 9.

Figure 18:
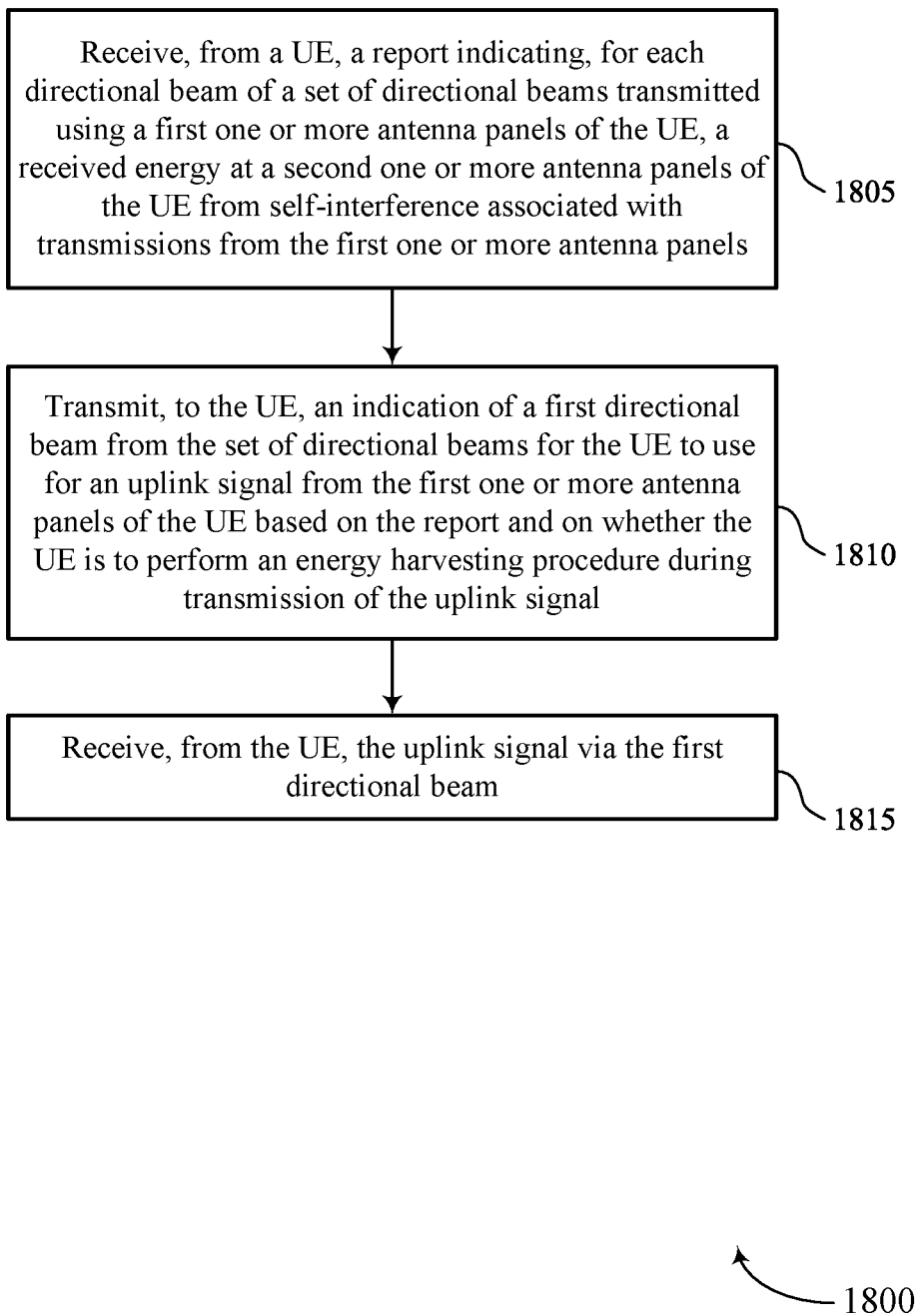

FIG. 18 shows a flowchart illustrating a method 1800 that supports energy harvesting via self-interference in a full-duplex communication mode in accordance with aspects of the present disclosure. The operations of the method 1800 may be implemented by a base station or its components as described herein. For example, the operations of the method 1800 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1805, the method may include receiving, from a UE, a report indicating, for each directional beam of a set of directional beams transmitted using a first one or more antenna panels of the UE, a received energy at a second one or more antenna panels of the UE from self-interference associated with transmissions from the first one or more antenna panels. The operations of 1805 may be performed in accordance with examples as disclosed herein. In some examples, aspects of the operations of 1805 may be performed by an energy harvesting reporting component 1325 as described with reference to FIG. 13.

At 1810, the method may include transmitting, to the UE, an indication of a first directional beam from the set of directional beams for the UE to use for an uplink signal from the first one or more antenna panels of the UE based on the report and on whether the UE is to perform an energy harvesting procedure during transmission of the uplink signal. The operations of 1810 may be performed in accordance with examples as disclosed herein. In some examples, aspects of the operations of 1810 may be performed by a directional communication component 1330 as described with reference to FIG. 13.

At 1815, the method may include receiving, from the UE, the uplink signal via the first directional beam. The operations of 1815 may be performed in accordance with examples as disclosed herein. In some examples, aspects of the operations of 1815 may be performed by an uplink component 1335 as described with reference to FIG. 13.

The following provides an overview of aspects of the present disclosure:

Aspect 1: A method for wireless communication at a UE, comprising: transmitting, via a first one or more antenna panels of the UE, an uplink signal in accordance with a full-duplex communication mode of the UE; receiving, at a second one or more antenna panels of the UE, self-interference associated with the uplink signal; and performing an energy harvesting procedure at the second one or more antenna panels using the self-interference associated with the uplink signal.

Aspect 2: The method of aspect 1, further comprising: performing a beam sweeping procedure associated with transmitting signaling using a set of directional beams from the first one or more antenna panels; and measuring, at the second one or more antenna panels, a received energy from the signaling for each directional beam of the set of directional beams.

Aspect 3: The method of aspect 2, further comprising: transmitting, to a base station, a report indicating the received energy at the second one or more antenna panels from the signaling for each directional beam of the set of directional beams.

Aspect 4: The method of aspect 3, further comprising: receiving, from the base station, an indication of a first directional beam to use for the uplink signal based at least in part on the report and a receive power at the base station of signaling transmitted via the first directional beam, wherein the UE transmits the uplink signal using the first directional beam based at least in part on receiving the indication.

Aspect 5: The method of any of aspects 3 or 4, further comprising: transmitting, to the base station, an indication of an energy harvesting rate for operation of one or more components of the UE; and receiving, from the base station, an indication of a first directional beam to use for the uplink signal based at least in part on the report and the energy harvesting rate for the operation of the one or more components of the UE, wherein the UE transmits the uplink signal using the first directional beam based at least in part on receiving the indication.

Aspect 6: The method of any of aspects 1 through 5, further comprising: receiving, from a base station, a control signal associated with a CG that indicates a first directional beam for CG uplink transmissions with energy harvesting and a second directional beam for CG uplink transmissions without energy harvesting, wherein the uplink signal comprises a CG uplink transmission with energy harvesting.

Aspect 7: The method of aspect 6, wherein the UE performs the CG uplink transmissions with energy harvesting using the first directional beam during time periods without simultaneous downlink reception and performs the CG uplink transmissions without energy harvesting using the second directional beam during time periods with simultaneous downlink reception.

Aspect 8: The method of any of aspects 1 through 7, further comprising: refraining from applying interference cancellation associated with the uplink signal at the second one or more antenna panels, wherein performing the energy harvesting procedure is based at least in part on refraining from applying the interference cancellation associated with the uplink signal.

Aspect 9: The method of any of aspects 1 through 8, further comprising: selecting the first one or more antenna panels for the transmitting of the uplink signal and the second one or more antenna panels for the receiving of the self-interference associated with the uplink signal such that a physical separation between the first one or more antenna panels and the second one or more antenna panels is less than a threshold physical separation.

Aspect 10: The method of any of aspects 1 through 9, wherein the UE transmits the uplink signal during a time period without simultaneous downlink reception, and the full-duplex communication mode of the UE is associated with active operation of the first one or more antenna panels for transmission and active operation of the second one or more antenna panels for energy harvesting.

Aspect 11: A method for wireless communication at a base station, comprising: receiving, from a UE, a report indicating, for each directional beam of a set of directional beams transmitted using a first one or more antenna panels of the UE, a received energy at a second one or more antenna panels of the UE from self-interference associated with transmissions from the first one or more antenna panels; transmitting, to the UE, an indication of a first directional beam from the set of directional beams for the UE to use for an uplink signal from the first one or more antenna panels of the UE based at least in part on the report and on whether the UE is to perform an energy harvesting procedure during transmission of the uplink signal; and receiving, from the UE, the uplink signal via the first directional beam.

Aspect 12: The method of aspect 11, further comprising: receiving, from the UE, an indication of an energy harvesting rate for operation of one or more components of the UE, wherein transmitting the indication of the first directional beam to use for the uplink signal from the first one or more antenna panels of the UE is based at least in part on the report and the energy harvesting rate for the operation of the one or more components of the UE.

Aspect 13: The method of any of aspects 11 or 12, further comprising: transmitting, to the UE, a control signal associated with a CG that indicates the first directional beam for CG uplink transmissions with energy harvesting and a second directional beam for CG uplink transmissions without energy harvesting, wherein the uplink signal comprises a CG uplink transmission with energy harvesting.

Aspect 14: The method of aspect 13, wherein the base station receives the CG uplink transmissions with energy harvesting via the first directional beam during time periods without simultaneous transmission to the UE and receives the CG uplink transmissions without energy harvesting via the second directional beam during time periods with simultaneous transmission to the UE.

Aspect 15: The method of any of aspects 11 through 14, further comprising: selecting the first directional beam for the UE to use for the uplink signal from the first one or more antenna panels of the UE based at least in part on the report, whether the UE is to perform the energy harvesting procedure during the transmission of the uplink signal, and a receive power at the base station of signaling transmitted via the set of directional beams, wherein transmitting the indication of the first directional beam is based at least in part on the selecting.

Aspect 16: The method of any of aspects 11 through 15, wherein the base station receives the uplink signal during a time period without simultaneous downlink transmission to the UE, and the UE is to perform the energy harvesting procedure during the time period based at least in part on the time period being without the simultaneous downlink transmission to the UE.

Aspect 17: An apparatus for wireless communication at a UE, comprising a processor; memory coupled with the processor; and instructions stored in the memory and executable by the processor to cause the apparatus to perform a method of any of aspects 1 through 10.

Aspect 18: An apparatus for wireless communication at a UE, comprising at least one means for performing a method of any of aspects 1 through 10.

Aspect 19: A non-transitory computer-readable medium storing code for wireless communication at a UE, the code comprising instructions executable by a processor to perform a method of any of aspects 1 through 10.

Aspect 20: An apparatus for wireless communication at a base station, comprising a processor; memory coupled with the processor; and instructions stored in the memory and executable by the processor to cause the apparatus to perform a method of any of aspects 11 through 16.

Aspect 21: An apparatus for wireless communication at a base station, comprising at least one means for performing a method of any of aspects 11 through 16.

Aspect 22: A non-transitory computer-readable medium storing code for wireless communication at a base station, the code comprising instructions executable by a processor to perform a method of any of aspects 11 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    transmitting, via a first one or more antenna panels of the UE, an uplink signal in accordance with a full-duplex communication mode of the UE;
    receiving, at a second one or more antenna panels of the UE, self-interference associated with the uplink signal; and
    performing, based at least in part on active operation of the second one or more antenna panels for energy harvesting, an energy harvesting procedure at the second one or more antenna panels using the self-interference associated with the uplink signal.

2. The method of claim 1, further comprising:
    performing a beam sweeping procedure associated with transmitting signaling using a set of directional beams from the first one or more antenna panels; and
    measuring, at the second one or more antenna panels, a received energy from the signaling for each directional beam of the set of directional beams.

3. The method of claim 2, further comprising:
    transmitting, to a network device, a report indicating the received energy at the second one or more antenna panels from the signaling for each directional beam of the set of directional beams.

4. The method of claim 3, further comprising:
    receiving, from the network device, an indication of a first directional beam to use for the uplink signal based at least in part on the report and a receive power at the network device of signaling transmitted via the first directional beam, wherein the UE transmits the uplink signal using the first directional beam based at least in part on receiving the indication.

5. The method of claim 3, further comprising:
    transmitting, to the network device, an indication of an energy harvesting rate for operation of one or more components of the UE; and
    receiving, from the network device, an indication of a first directional beam to use for the uplink signal based at least in part on the report and the energy harvesting rate for the operation of the one or more components of the UE, wherein the UE transmits the uplink signal using the first directional beam based at least in part on receiving the indication.

6. The method of claim 1, further comprising:
    receiving, from a network device, a control signal associated with a configured grant that indicates a first directional beam for configured grant uplink transmissions with energy harvesting and a second directional beam for configured grant uplink transmissions without energy harvesting, wherein the uplink signal comprises a configured grant uplink transmission with energy harvesting.

7. The method of claim 6, wherein the UE performs the configured grant uplink transmissions with energy harvesting using the first directional beam during time periods without simultaneous downlink reception and performs the configured grant uplink transmissions without energy harvesting using the second directional beam during time periods with simultaneous downlink reception.

8. The method of claim 1, further comprising:
    refraining from applying interference cancellation associated with the uplink signal at the second one or more antenna panels, wherein performing the energy harvesting procedure is based at least in part on refraining from applying the interference cancellation associated with the uplink signal.

9. The method of claim 1, further comprising:
    selecting the first one or more antenna panels for the transmitting of the uplink signal and the second one or more antenna panels for the receiving of the self-interference associated with the uplink signal such that a physical separation between the first one or more antenna panels and the second one or more antenna panels is less than a threshold physical separation.

10. The method of claim 1, wherein:
    the UE transmits the uplink signal during a time period without simultaneous downlink reception; and
    the full-duplex communication mode of the UE is associated with active operation of the first one or more antenna panels for transmission and the active operation of the second one or more antenna panels for the energy harvesting.

11. A user equipment (UE), comprising:
    a processor;
    memory coupled with the processor; and
    instructions stored in the memory and executable by the processor to cause the UE to:
        transmit, via a first one or more antenna panels of the UE, an uplink signal in accordance with a full-duplex communication mode of the UE;
        receive, at a second one or more antenna panels of the UE, self-interference associated with the uplink signal; and
        perform, based at least in part on active operation of the second one or more antenna panels for energy harvesting, an energy harvesting procedure at the second one or more antenna panels using the self-interference associated with the uplink signal.

12. The UE of claim 11, wherein the instructions are further executable by the processor to cause the UE to:
    perform a beam sweeping procedure associated with transmitting signaling using a set of directional beams from the first one or more antenna panels; and
    measure, at the second one or more antenna panels, a received energy from the signaling for each directional beam of the set of directional beams.

13. The UE of claim 12, wherein the instructions are further executable by the processor to cause the UE to:
    transmit, to a network device, a report indicating the received energy at the second one or more antenna panels from the signaling for each directional beam of the set of directional beams.

14. The UE of claim 13, wherein the instructions are further executable by the processor to cause the UE to:
receive, from the network device, an indication of a first directional beam to use for the uplink signal based at least in part on the report and a receive power at the network device of signaling transmitted via the first directional beam, wherein the UE transmits the uplink signal using the first directional beam based at least in part on receiving the indication.

15. The UE of claim 13, wherein the instructions are further executable by the processor to cause the UE to:
transmit, to the network device, an indication of an energy harvesting rate for operation of one or more components of the UE; and
receive, from the network device, an indication of a first directional beam to use for the uplink signal based at least in part on the report and the energy harvesting rate for the operation of the one or more components of the UE, wherein the UE transmits the uplink signal using the first directional beam based at least in part on receiving the indication.

16. The UE of claim 11, wherein the instructions are further executable by the processor to cause the UE to:
receive, from a network device, a control signal associated with a configured grant that indicates a first directional beam for configured grant uplink transmissions with energy harvesting and a second directional beam for configured grant uplink transmissions without energy harvesting, wherein the uplink signal comprises a configured grant uplink transmission with energy harvesting.

17. The UE of claim 16, wherein the UE performs the configured grant uplink transmissions with energy harvesting using the first directional beam during time periods without simultaneous downlink reception and performs the configured grant uplink transmissions without energy harvesting using the second directional beam during time periods with simultaneous downlink reception.

18. The UE of claim 11, wherein the instructions are further executable by the processor to cause the UE to:
refrain from applying interference cancellation associated with the uplink signal at the second one or more antenna panels, wherein performing the energy harvesting procedure is based at least in part on refraining from applying the interference cancellation associated with the uplink signal.

19. The UE of claim 11, wherein the instructions are further executable by the processor to cause the UE to:
select the first one or more antenna panels for the transmitting of the uplink signal and the second one or more antenna panels for the receiving of the self-interference associated with the uplink signal such that a physical separation between the first one or more antenna panels and the second one or more antenna panels is less than a threshold physical separation.

20. The UE of claim 11, wherein:
the UE transmits the uplink signal during a time period without simultaneous downlink reception; and
the full-duplex communication mode of the UE is associated with active operation of the first one or more antenna panels for transmission and the active operation of the second one or more antenna panels for the energy harvesting.

21. An apparatus for wireless communication at a user equipment (UE), comprising:
means for transmitting, via a first one or more antenna panels of the UE, an uplink signal in accordance with a full-duplex communication mode of the UE;
means for receiving, at a second one or more antenna panels of the UE, self-interference associated with the uplink signal; and
means for performing, based at least in part on active operation of the second one or more antenna panels for energy harvesting, an energy harvesting procedure at the second one or more antenna panels using the self-interference associated with the uplink signal.

22. The apparatus of claim 21, further comprising:
means for performing a beam sweeping procedure associated with transmitting signaling using a set of directional beams from the first one or more antenna panels; and
means for measuring, at the second one or more antenna panels, a received energy from the signaling for each directional beam of the set of directional beams.

23. The apparatus of claim 22, further comprising:
means for transmitting, to a network device, a report indicating the received energy at the second one or more antenna panels from the signaling for each directional beam of the set of directional beams.

24. The apparatus of claim 23, further comprising:
means for receiving, from the network device, an indication of a first directional beam to use for the uplink signal based at least in part on the report and a receive power at the network device of signaling transmitted via the first directional beam, wherein the UE transmits the uplink signal using the first directional beam based at least in part on receiving the indication.

25. The apparatus of claim 23, further comprising:
means for transmitting, to the network device, an indication of an energy harvesting rate for operation of one or more components of the UE; and
means for receiving, from the network device, an indication of a first directional beam to use for the uplink signal based at least in part on the report and the energy harvesting rate for the operation of the one or more components of the UE, wherein the UE transmits the uplink signal using the first directional beam based at least in part on receiving the indication.

26. The apparatus of claim 21, further comprising:
means for receiving, from a network device, a control signal associated with a configured grant that indicates a first directional beam for configured grant uplink transmissions with energy harvesting and a second directional beam for configured grant uplink transmissions without energy harvesting, wherein the uplink signal comprises a configured grant uplink transmission with energy harvesting.

27. The apparatus of claim 26, wherein the UE performs the configured grant uplink transmissions with energy harvesting using the first directional beam during time periods without simultaneous downlink reception and performs the configured grant uplink transmissions without energy harvesting using the second directional beam during time periods with simultaneous downlink reception.

28. The apparatus of claim 21, further comprising:
means for refraining from applying interference cancellation associated with the uplink signal at the second one or more antenna panels, wherein performing the energy harvesting procedure is based at least in part on refraining from applying the interference cancellation associated with the uplink signal.

29. The apparatus of claim 21, further comprising:
means for selecting the first one or more antenna panels for the transmitting of the uplink signal and the second one or more antenna panels for the receiving of the self-interference associated with the uplink signal such that a physical separation between the first one or more antenna panels and the second one or more antenna panels is less than a threshold physical separation.

30. A non-transitory computer-readable medium storing code for wireless communication at a UE, the code comprising instructions executable by a processor to:
transmit, via a first one or more antenna panels of the UE, an uplink signal in accordance with a full-duplex communication mode of the UE;
receive, at a second one or more antenna panels of the UE, self-interference associated with the uplink signal; and
perform, based at least in part on active operation of the second one or more antenna panels for energy harvesting, an energy harvesting procedure at the second one or more antenna panels using the self-interference associated with the uplink signal.

* * * * *